United States Patent [19]
Friedmann et al.

[11] Patent Number: 6,129,188
[45] Date of Patent: Oct. 10, 2000

[54] TRANSMISSION FOR MOTOR VEHICLE

[75] Inventors: Oswald Friedmann, Lichtenau; Bernhard Walter, Oberkirch; Manfred Homm; Michael Reuschel, both of Bühl, all of Germany

[73] Assignee: LuK Getriebe-Systeme GmbH, Buhl/Baden, Germany

[21] Appl. No.: 09/103,276

[22] Filed: Jun. 23, 1998

[30] Foreign Application Priority Data

Jul. 14, 1997 [DE] Germany ............................ 197 30 031
Mar. 11, 1998 [DE] Germany ............................ 198 10 427

[51] Int. Cl.$^7$ ............................ B60K 41/22; F16D 13/72
[52] U.S. Cl. ................ 192/3.58; 192/70.12; 192/85 AA; 192/113.34
[58] Field of Search .................................. 192/3.57, 3.58, 192/85 R, 85 AA, 70.12, 113.3, 113.34, 113.35, 113.36; 474/28

[56] References Cited

U.S. PATENT DOCUMENTS

| | | |
|---|---|---|
| 4,856,628 | 8/1989 | Momiyama ............................ 192/3.58 |
| 5,046,991 | 9/1991 | Friedmann . |
| 5,074,394 | 12/1991 | Motohashi ............................ 192/70.12 |
| 5,169,365 | 12/1992 | Friedmann . |
| 5,217,412 | 6/1993 | Indlekofer et al. . |
| 5,295,915 | 3/1994 | Friedmann . |
| 5,577,588 | 11/1996 | Raszkowski ........................ 192/113.35 |
| 5,667,448 | 9/1997 | Friedmann . |
| 5,711,730 | 1/1998 | Friedmann et al. . |
| 5,725,447 | 3/1998 | Friedmann et al. ................... 474/28 X |

*Primary Examiner*—Richard M. Lorence
*Attorney, Agent, or Firm*—Darby & Darby

[57] ABSTRACT

A transmission for use in the power train of a motor vehicle has a rotary first component (such as a shaft), a second component which may but need not be rotatable, a fluid-conveying conduit having a first end portion extending into a first socket provided in the first component and a second end portion extending into a socket of the second component, a split-ring piston packing located in an external groove of the first end portion, and an O-ring received in an external groove of the second end portion. The O-ring prevents the conduit and the second component from rotating relative to each other. A passage which is defined by the two components and the conduit can receive a stream of pressurized hydraulic fluid from a pump by way of pipes wherein the flow of fluid is controlled by several valves including a manually operated slide valve, at least one preferably adjustable pressure regulating valve, at least one preferably adjustable safety valve, and adjuster for the adjustable valve or valves; such adjuster can employ one or more signal-responsive control valves.

7 Claims, 9 Drawing Sheets

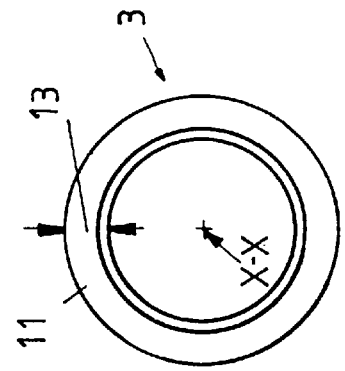
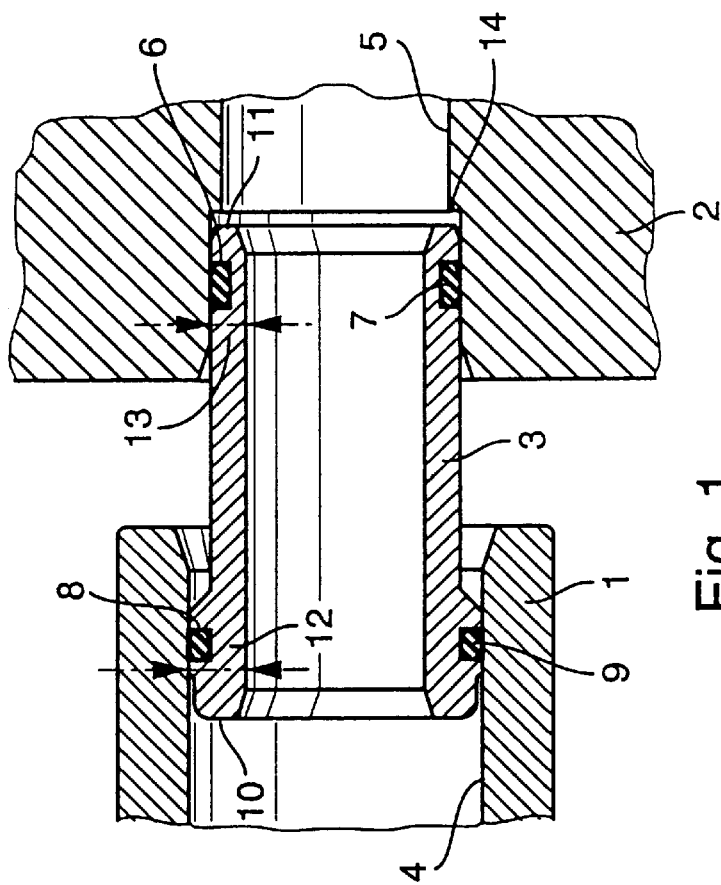
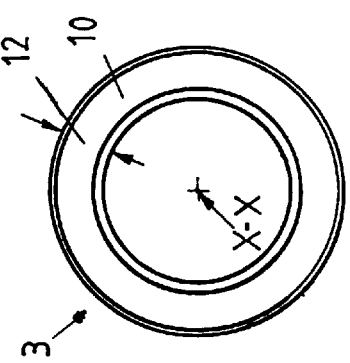

TRANSMISSION FOR MOTOR VEHICLE

BACKGROUND OF THE INVENTION

The present invention relates to improvements in transmissions which can be employed with advantage in the power trains of motor vehicles to transmit torque from a prime mover (such as an internal combustion engine) to the wheels. More particularly, the invention relates to improvements in transmissions which comprise clutches, actuators, torque sensors, pulleys, belts or chains and/or other parts controlled by systems of pumps, valves and other fluid flow initiating and regulating devices.

It is often necessary to convey a fluid (e.g., oil or another hydraulic fluid) between parts which must move with and/or relative to each other, e.g., between a stationary component and a rotary component or between two components which can or must or should rotate at different speeds an/or in different directions. Transmissions wherein a conduit, a pipe, a hose or an analogous fluid conveying component must confine a stream of a fluid to flow between two spaced-apart components which can or should move relative to each other are well known in the art of power trains for motor vehicles.

It is also known to mount the fluid conveying component (hereinafter called conduit for short) in such a way that it can further serve as a means for compensating for manufacturing tolerances and/or for improper centering of one of the two spaced-apart components relative to the other component (and/or vice versa) and/or for pronounced or unanticipated or normal wear upon the spaced-apart components. In accordance with a presently known proposal, one end portion of a small-diameter conduit is introduced into a bore of one of two spaced-apart components, and the other end portion of such conduit is confined in a bore of the other of the two spaced-apart components. Each end portion is surrounded by a split-ring piston packing which is intended to seal the end portion of the respective bore. Each such packing is further intended to act as a constituent of a universal joint which enables the respective component to perform at least some stray movements (i.e., movements other than strictly angular movements) relative to the other component. Such, stray movements might be necessary to account or to compensate for certain manufacturing tolerances and/or for wear and/or for lack of accurate centering of the end portions of the conduit in the bores of the respective components. As a rule, the ability of the end portions of the conduit and of the split-ring piston packings to act as parts of a universal joint is enhanced by enlarging those portions of the bores which receive the packings.

A drawback of such connections for the end portions of the conduit is that the universal joints permit pronounced and often excessive leakage of the conveyed fluid. This can entail a penetration of a coolant or a lubricant or a force transmitting fluid agent into certain parts of a power train which should not be lubricated and/or cooled and/or wetted. Furthermore, the escaping fluid must be replaced at frequent intervals, or the reservoirzs) for such fluid must be designed to confine large quantities of oil or another fluid medium.

OBJECTS OF THE INVENTION

An object of the invention is to provide a novel and improved combination of parts which can be utilized to convey a fluid, particularly oil or another hydraulic fluid, to or from one or more consumers and which must or should be free to move relative to each other.

Another object of the invention is to provide a novel and improved method of reducing or eliminating leakage of a fluid which can or which must be conveyed at an elevated pressure along a path defined by parts that are movable relative to each other.

A further object of the invention is to provide a novel and improved method of reducing or eliminating leakage of a pressurized fluid from a path which is defined by parts that should be capable of performing axial and/or angular and/or other types of movements (such as universal movements) relative to each other.

An additional object of the invention is to provide a novel and improved system of valves, pressure gauges, flow restrictors and/or other means for regulating the flow of a pressurized fluid from one or more pumps and/or other sources to one or more consumers, such as fluid-operated clutches, fluid-operated actuators (e.g., cylinder and piston units) and/or others.

Still another object of the invention is to provide a novel and improved system for cooling one or more fluid-operated clutches, cylinder-and-piston units and/or other fluid-consuming or fluid-operated constituents of motor vehicles, particularly of power trains for use in motor vehicles.

A further object of the invention is to provide a novel and improved transmission, such as a continuously variable transmission (known as CVT), particularly for use in the power trains of motor vehicles. Another object of the invention is to provide a novel and improved system for regulating the flow of a hydraulic fluid between a pump, one or more consumers, and a sump in the power train of a motor vehicle.

An additional object of the invention is to provide a fluid flow regulating system which ensures a highly accurate, predictable and at least substantially leakage-free flow of a pressurized fluid from one or more pumps, accumulators and/or other sources to one or more consumers and from the consumer(s) back to the source(s) of pressurized fluid or to reservoirs for confinement of the fluid which is to be pumped to one or more consumers. Still another object of the invention is to provide a transmission which is constructed and assembled in such a way that the flow of a pressurized or spent hydraulic fluid can be regulated with a maximum degree of accuracy under circumstances which are most likely to develop, again and again, in actual use of the transmission.

A further object of the invention is to provide a novel and improved transmission which employs a plurality of starting clutches, such as at least two disc clutches.

Another object of the invention is to provide a novel and improved method of repeatedly circulating a body of oil or another hydraulic fluid through one or more pumps, reservoirs, sumps, conduits and consumers in a transmission, such as a continuously variable transmission with adjustable pulleys and an endless chain or belt trained over such pulleys.

An additional object of the invention is to provide a novel and improved combination of valves, flow restrictors, fluid flow and fluid pressure monitoring gauges and like constituents for use in conjection with the starting clutch or clutches and/or fluid-operated actuator means of transmissions for use in the power trains of motor vehicles.

Still another object of the invention is to provide a motor vehicle, such as a passenger car or a van or a truck, wherein the power train embodies a transmission of the above outlined character.

A further object of the invention is to provide novel and improved valves and combinations of two or more valves for use in transmissions of the type wherein one or more friction clutches (such as disc clutches), one or more cylinder-and-piston units and/or other fluidoperated parts must receive and must be relieved of predetermined quantities of pressurized hydraulic fluids.

SUMMARY OF THE INVENTION

One of several features of the instant invention resides in the provision of a fluid conveying structure which can be utilized in the transmission of the power train in a motor vehicle and comprises a first component having a first socket (such as the end portion of a through bore), a second component having a second socket (e.g., the end portion of a through bore), a conduit having a first end portion in the first socket and a second end portion in the second socket, at least one first sealing element which is interposed between the first component and the first end portion in the first socket with freedom of rotation of the first component and the first end portion of the conduit relative to each other, and at least one second sealing element which is interposed between the second component and the second end portion in the second socket and is arranged to prevent rotation of the second component and the second end portion of the conduit relative to each other.

The first component, the second component and/or the conduit can form part of a transmission.

It is preferred to select the material of the at least one second sealing element in such a way that this sealing element is resiliently deformable and is located between the second component and the second end portion of the conduit in a deformed condition so that it bears upon the second component and the second end portion of the conduit with a force which is sufficient to compel the second component and the second end portion of the conduit to share rotary movements.

The first end portion of the conduit has an external surface which is located in the first socket and can be provided with a circumferential groove for a piston packing (such as a split-ring piston packing) forming part of or constituting the at least one first sealing element.

An external surface of the second end portion of the conduit is located in the second socket and can be provided with a circumferential groove for the at least one second sealing element (e.g., an O-ring).

The wall thickness of one end portion of the conduit (as measured radially of the conduit) is or can be different from the wall thickness of the other end portion of the conduit. It is often preferred to select the dimensions of the conduit in such a way that the wall thickness of its first end portion exceeds the wall thickness of the second end portion.

An internal stop of the second component can constitute an abutment for the end face at the second end portion of the conduit to thus limit the extent of lengthwise movement which the conduit can perform in a direction from the first component toward the second component, e.g., when the conduit is being acted upon by a fluid flowing into the first end portion and toward the second end portion of the conduit.

The central longitudinal axis of the conduit can coincide with the axes of the two sockets, and the internal stop can constitute an annular internal shoulder of the second component in the deepmost portion of the second socket. The first and second components and the conduit can be mounted for rotation about a common axis, and the improved structure can further comprise means (e.g., the output element of an engine or the output element of a friction clutch in the power train of a motor vehicle) for rotating the first component at a first speed $n_1$, and means for rotating the second component at a speed $n_2$ which is less than the first speed $n_1$. The arrangement can be such that the speed $n_1$ can exceed the speed $n_2$ and the latter can equal $n_3$ (which is the speed of the conduit). Alternatively, the speed $n_2$ can match the speed $n_3$ and can exceed the speed $n_1$. It is also possible to select the speeds in such a way that $n_1$ exceeds zero speed but the speeds $n_2$ and $n_3$ are zero. At least one of the components can rotate about the central longitudinal axis of the conduit.

Another feature of the invention resides in the provision of a transmission which can be utilized in the power train of a motor vehicle and comprises a clutch (such as a starting clutch) having a cylinder defining a chamber, a piston which is movable in the chamber, a clutch disc having a portion disposed in the chamber and including a first side adjacent the piston and a second side, and first energy storing means acting upon the second side of the clutch disc (against a variable pressure of a fluid in the chamber) in a direction to expel fluid from the chamber. The transmission further comprises means for supplying to the chamber a fluid at the aforementioned variable pressure, and such fluid supplying means comprises a source (e.g., a pump) of pressurized fluid, means for connecting the source with the chamber, a pressure reducing valve having a housing which is associated with the connecting means (the housing can be installed in the connecting means), a valving element which is movable in the housing between a plurality of positions, and second energy storing means serving to yieldably urge or bias the valving element to a predetermined position in which the pressure of fluid in the cylinder chamber counteracts the bias of the first energy storing means, and a control valve which operates to determine the positions of the valving element. The control valve can assume a plurality of different conditions including a preselected condition in which the control valve exerts no appreciable influence (if any) upon the valving element to thus permit the valving element to assume its predetermined position under the influence of the second energy storing means.

The connecting means of the just described transmission can comprise a first component having a first socket, a second component having a second socket, a conduit having a first end portion in the first socket and a second end portion in the second socket, at least one first sealing element which is interposed between the first component and the first end portion of the conduit in the first socket with freedom of rotation of the first component and the first end portion of the conduit relative to each other, and at least one second sealing element which is interposed between the second component and the second end portion of the conduit in the second socket and is arranged to prevent rotation of the second component and the second end portion of the conduit relative to each other. The two Lcomponents and the conduit jointly define an elongated path for the flow of fluid between the source and the chamber of the cylinder in the clutch.

The housing of the pressure reducing valve can be provided with a first inlet (e.g., a port) which is arranged to receive fluid from the control valve (or which can receive fluid at a rate and/or at a pressure determined by the control valve), a second inlet (e.g., a port) which is arranged to receive fluid from the source (e.g., from a pump at system pressure), an outlet which is communicatively connectable with the source of pressurized fluid by way of the second inlet, and a third inlet (e.g., a port) communicating with the outlet. The valving element of the pressure reducing valve has a first surface which is being acted upon by the energy storing means as well as by fluid which is supplied by or under the influence of the control valve by way of the first inlet to urge the valving element to a position in which the outlet communicates with the second inlet, and a second surface which is being acted upon by fluid entering the housing by way of the third inlet when the outlet communicates with the second inlet to thus urge the valving element—against the bias of the second energy storing means and against the pressure of fluid upon the first surface—to a position in which the second inlet is sealed from the outlet.

The valving element of the pressure reducing valve can be arranged to seal the second inlet from the outlet when the pressure of fluid in the chamber at least approximates the bias of the first energy storing means.

The second energy storing means can comprise at least one coil spring. The first face of the valving element in the housing of the pressure reducing valve can constitute an end face of such valving element, and the housing can be provided with a compartment which is adjacent the end face of the valving element and communicates with the first inlet.

The transmission can further comprise a second pressure reducing valve which is installed in the connecting means between the source and the control valve to reduce the pressure of fluid which is being supplied by the source to the control valve so that the pressure of fluid at the first inlet is maintained within a range of between zero pressure and a predetermined maximum pressure.

The clutch can constitute a disc clutch, particularly a clutch having a first set of clutch discs mounted on a first rotary carrier and a second set of clutch discs mounted on a second carrier which can rotate with or relative to the first carrier.

The first energy storing means can comprise at least one diaphragm spring.

A third feature of the invention resides in the provision of a transmission, particularly for use in a power train of a motor vehicle. The improved transmission comprises at least one fluid-operated engageable and disengageable clutch (such as a starting clutch) including a cylinder and a piston which is movable in the cylinder, at least one source of pressurized fluid, conduit means connecting the source with the cylinder, an adjustable pressure regulating valve in the conduit means, an adjustable safety valve in the conduit means between the pressure regulating valve and the cylinder, and means for adjusting the at least one safety valve (such adjusting means can comprise at least one control valve or pilot valve).

The safety valve can include a slide valve having a housing and a valving element (e.g., in the form of a spool) movable in the housing of the slide valve by the at least one pilot (control) valve. The spool of the slide valve is movable to a position in which the safety valve establishes communication between a chamber of the cylinder and the pressure regulating valve. It is further desirable that the spool be also movable to a second position in which the safety valve prevents the flow of fluid between the chamber of the cylinder and the pressure regulating valve and connects the chamber with a sump to thus reduce the presssure of fluid in the chamber.

In accordance with a desirable feature of the just described transmission, the pilot valve or control valve is arranged to adjust the safety valve as well as the pressure regulating valve. For example, the pilot valva can be arranged to furnish to the pressure regulating valve and to the safety valve fluid at a plurality of different pressures including an elevated pressure to thereby change the condition of the safety valve, a low pressure at which the condition of the pressure regulating valve remains unchanged, and a median pressure to thus change the condition of the pressure regulating valve.

An additional feature of the invention resides in the provision of a transmission, particularly for use in a power train of a motor vehicle, which comprises first and second fluid-operated engageable and disengageable clutches each of which includes a cylinder and a piston movable in the respective cylinder, at least one pump or another suitable source of pressurized fluid, conduit means connecting the at least one source with the cylinders of the two clutches, a pressure regulating valve in the conduit means, an adjustable safety valve in the conduit means between the pressure regulating valve and the cylinders (as seen in the direction of fluid flow from the source toward the cylinders), means for adjusting the safety valve, including at least one pilot valve, and a selecting valve in the conduit means between the safety valve and the cylinders. The selecting valve is arranged to assume a first condition in which the conduit means can supply fluid only to the cylinder of the first clutch and a second condition in which the conduit means can supply fluid only to the cylinder of the second clutch.

Such transmission can further comprise at least one fluid pressure monitoring device (e.g., a signal transmitting pressure gauge) which is installed in the conduit means upstream of the selecting valve, as seen in the direction of fluid flow toward the cylinders.

One of the clutches can constitute a forward drive clutch. Furthermore, at least one of the clutches can constitute a reverse drive clutch.

Still another feature of the invention resides in the provision of a variable-speed transmission which can be utilized with particular advantage in the power train of a motor vehicle and comprises at least one fluid-operated clutch including a cylinder and a piston movable in a chamber of the cylinder, means for cooling the at least one clutch, at least one fluid-operated actuator, at least one source of pressurized fluid, conduit means connecting the at least one source with the at least one clutch and the at least one actuator, an adjustable slide valve which is installed in the conduit means and includes a housing and a valving element movable in the housing between a plurality of positions, and means for adjusting the slide valve including a pilot valve or control valve arranged to move the valving element of the adjustable slide valve (a) to a first position in which the slide valve permits fluid to flow from the cylinder and from the at least one actuator to the at least one source, and (b) a second position in which the slide valve establishes a path for the flow of fluid to a pump (such as a suction type jet pump) which is arranged to supply fluid to the cooling means.

The at least one source can include a second pump.

The conduit means can include a bypass conduit arranged to convey fluid to the jet pump in the second position of the valving element, and such transmission can further comprise at least one flow restrictor (e.g., a standard throttle) in the bypass conduit.

The transmission can further comprise an adjustable safety valve which is provided in the conduit means between the slide valve on the one hand, and the cylinder and the at least one actuator on the other hand.

The safety valve is or can be adjustable by the pilot valve. Such pilot valve can be arranged to furnish to the slide valve and to the safety valve fluid at a plurality of different pressures including, for example, a high pressure (e.g., a maximum pressure) to thereby change the condition of the safety valve, a minimum pressure (e.g., zero pressure) at which the condition of the slide valve remains unchanged, and a medium pressure to thus change the condition of the slide valve.

The novel features which are considered as characteristic of the invention are set forth in particular in the appended claims. The improved transmission itself, however, both as to its construction and the mode of assembling, adjusting and operating the same, together with numerous additional important novel and advantageous features thereof, will be best understood upon perusal of the following detailed description of certain presently preferred specific embodiments with reference to the accompanying drawings.

BRIEF DESCRIPTION OF THE DRAWINGS

FIG. 1 is a fragmentary axial sectional view of a detail in a transmission wherein two fluid conveying components which rotate at different speeds are connected to each other by a conduit in accordance with one feature of the invention;

FIG. 2 is an end elevational view of the conduit as seen from the left-hand side of FIG. 1;

FIG. 3 is an end elevational view of the conduit as seen from the right-hand side of FIG. 1;

DESCRIPTION OF PREFERRED EMBODIMENTS

Figure 4:
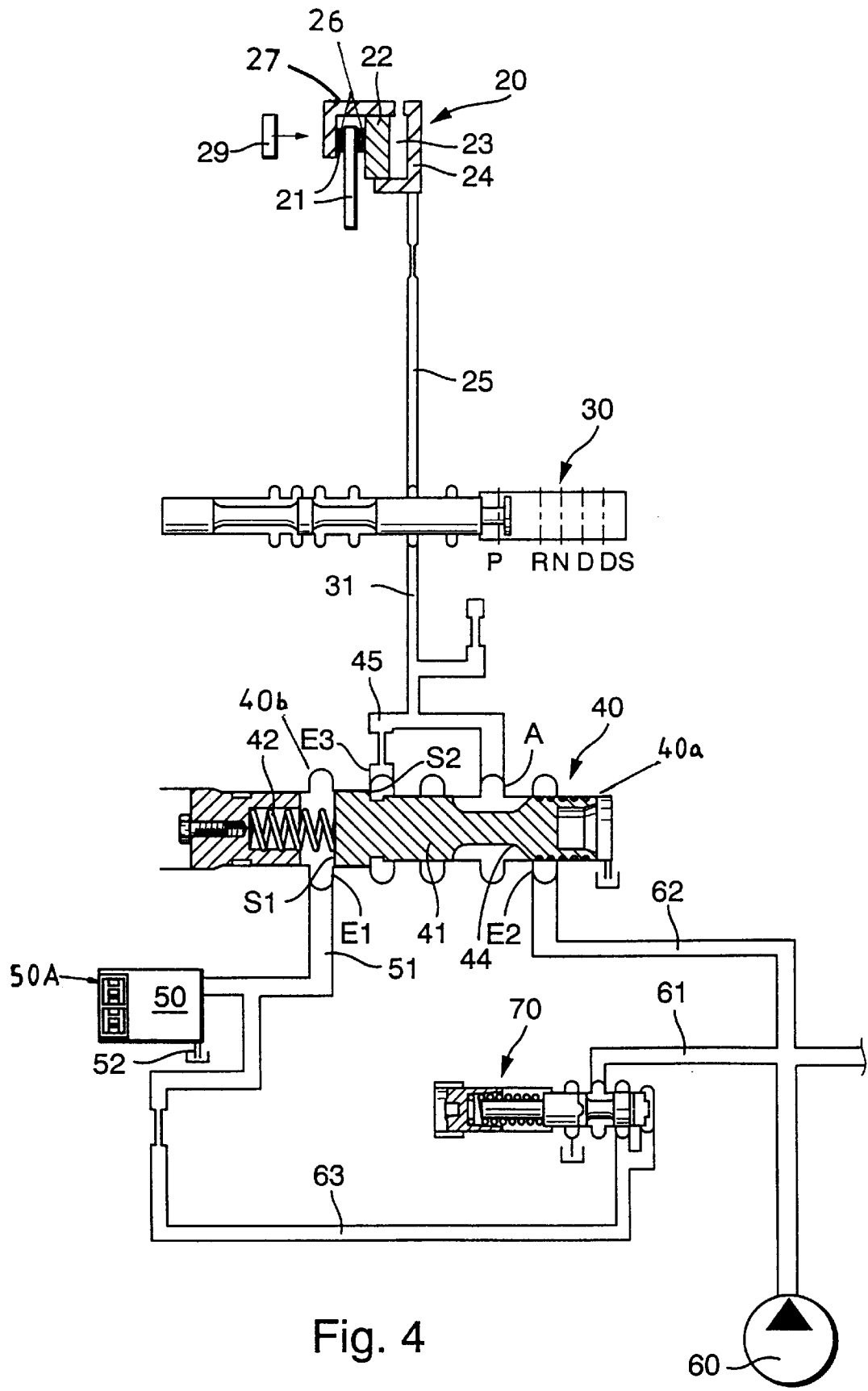
FIG. 4 is a schematic partly sectional view of a starting clutch which can be utilized in an automated transmission in the power train of a motor vehicle and embodies the features shown in FIGS. 1 to 3 as well as a hydraulic operating system for the starting clutch.
Figure 4A:
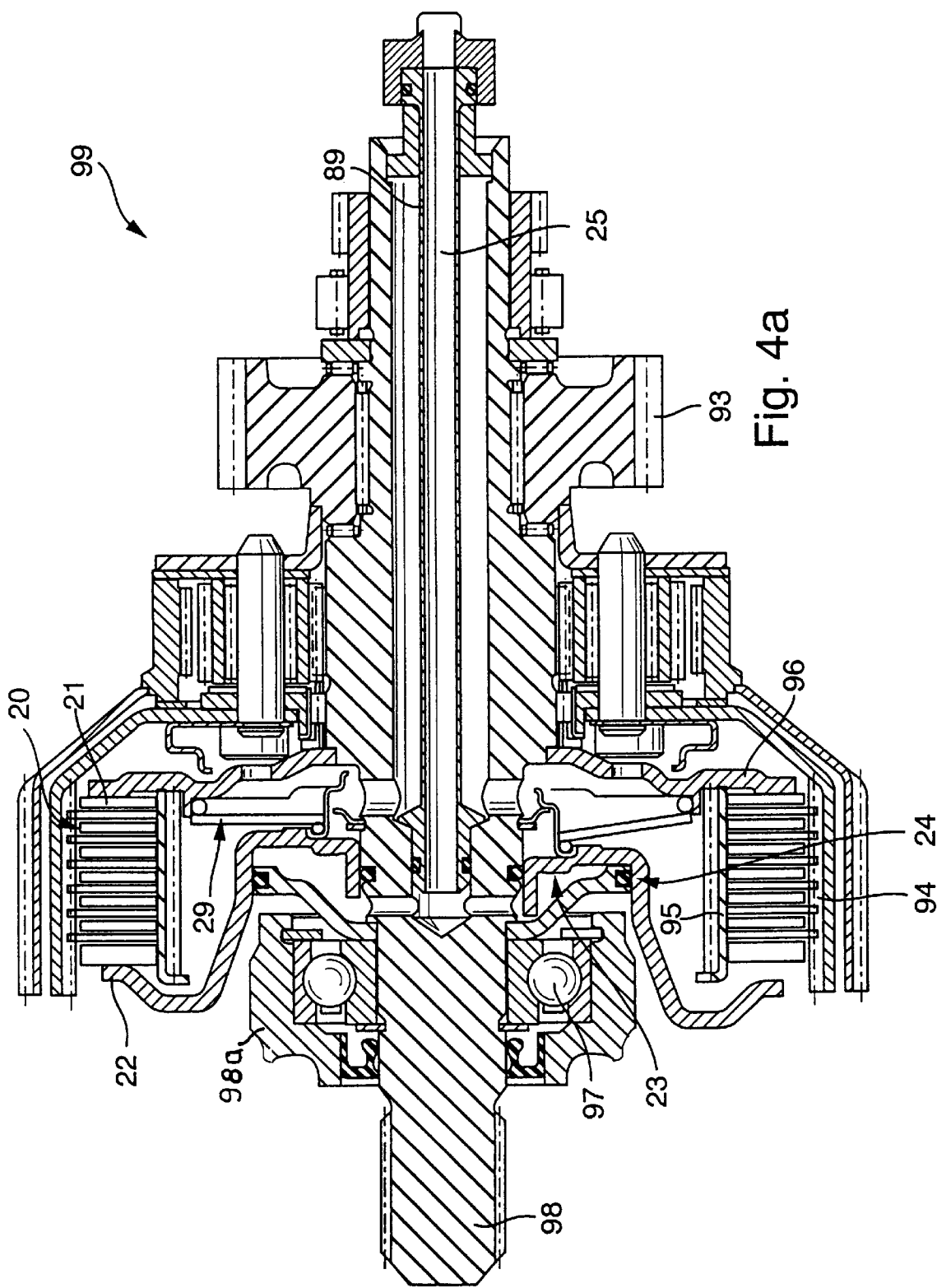
FIG. 4a is an axial sectional view of certain parts of a transmission which embodies the starting clutch of FIG. 4.

Referring first to FIG. 1, there is shown a structure which can be utilized with advantage in a starting clutch (such as the starting clutch 20 shown in FIGS. 4 and 4a) of a transmission (such as the transmission 99 shown in FIG. 4a). The structure of FIG. 1 compises a first component 1 (e.g., a hollow rotary cylindrical shaft corresponding to the part 98 shown in FIG. 4a), a second component 2 which may but need not be stationary (i.e., which may but need not rotate when the transmission 99 embodying the structure of FIG. 1 or 4a is in use), and an elongated cylindrical tube or conduit 3 between the components 1 and 2 (this conduit can correspond to the part 25 shown in FIGS. 4 and 4a). In the embodiment of FIG. 1, the first component 1 is rotatable about the central longitudinal axis X—X of the conduit 3, and such axis coincides with the axis of the second component 2.

The first component 1 is provided with a socket 4 in the form of the end portion of an axial bore which serves to supply a fluid (e.g., oil or another hydraulic fluid) into the left-hand end portion of the conduit 3. This end portion is adjacent the end face 10 of the conduit 3 and has a wall thickness 12 (as measured radially of the axis X—X) which exceeds the wall thickness 13 of the major portion (including the right-hand end portion at the end face 11) of the conduit. The cylindrical external surface of the relatively thick left-hand end portion of the conduit 3 is a rather snug fit in the socket 4 and has a circumferentially complete annular groove 8 for a first sealing element 9 here shown as a split-ring piston packing.

The sealing element 9 can be deformed to increase or reduce its diameter because it has two end portions which are movable toward or away from each other (as seen in the circumferential direction of the left-hand end portion of the conduit 3).

The right-hand end portion of the conduit 3 has a cylindrical external surface provided with a circumferentially complete groove 6 for a second sealing element 7 in the form of a resiliently deformable O-ring made of a suitable elastomeric material and being received in the groove 6 in deformed condition so that it establishes a fluidtight seal between the right-hand end portion of the conduit 3 and the second component 2 when the right-hand end portion of the conduit 3 is received in a bore or socket 5 of the second component 2.

In accordance with a highly advantageous feature of this embodiment of the invention, the frictional engagement between the deformed sealing element 7 on the one hand, and the second component 2 and the conduit 3 on the other hand, is sufficiently pronounced to ensure that the conduit 3 is compelled to share all angular movements (including zero angular movement) of the second component 2 and/or vice versa.

The end face 11 of the conduit 3 is shown at a certain axial distance from an internal stop or abutment 14 (shown in the form of a ring-shaped shoulder provided in the surface bounding the socket 5 and confronting the conduit 3). When the conduit 3 is compelled to move axially (in a direction to the right, as viewed in FIG. 1) under the action of a pressurized fluid which flows in the first component 1 and acts upon the end face 10, the extent of axial movement of the conduit 3 against the resistance of the sealing elements 9 and 7 is determined by the internal shoulder 14 which is engaged by the end face 11 to prevent any further axial displacement of the conduit 3 in the direction of the axis X—X and to the right, as viewed in FIG. 1.

The split-ring piston packing (first sealing element) 9 can be made of a metallic or any other suitable (e.g., plastic) material. The illustrated sealing element 9 has a polygonal (preferably square or rectangular) cross-sectional outline. In addition to being deformable in a sense to increase or reduce its diameter, the sealing element 9 is also deformable (or can be deformable) in the axial direction of the conduit 3, i.e., its end portions can move (at least slightly) relative to each other in the direction of the axis X—X. The dimensions of the sealing element 9 can be selected in such a way that its end portions are not in actual contact with (but preferably close to) each other when this sealing element is received in the groove 8 and the left-hand end portion of the conduit 3 is received in the socket 4 of the first component 1. It is further preferred to insert the sealing element 9 in a radially stressed condition so that, when the left-hand end portion of the conduit 3 is received in the socket 4, the sealing element 9 tends to expand and bears upon the internal surface surrounding the socket 4.

If the first component 1 is a hollow shaft which is rotated about the axis X—X at a speed $n_1$ and serves to supply a stream of a hydraulic fluid into the second component 2 by way of the axial bore or hole in the conduit 3, the rotational speed $n_2$ of the second component 2 can be less than $n_1$ (e.g., zero if the component 2 is a stationary housing or case, or a stationary part of a housing or case). As already mentioned above, the frictional engagement between the resilient sealing element 7 on the one hand, and the second component 2 and conduit 3 on the other hand, can be such that the conduit 3 does not rotate if the component 2 does not rotate, or that the conduit 3 rotates relative to the first component 1 and at the exact speed of the second component 2 if the latter is caused to rotate relative to the first component 1.

The area of the end face 10 of the conduit 3 which is shown in FIGS. 1 to 3 is greater than the area of the end face 11 because the outer diameter of the (thicker) left-hand end portion of the conduit 3 is greater than the outer diameter of the (thinner) right-hand end portion and because the inner diameters of the two end faces 10, 11 are at least substantially identical. The relatively large area of the end face 10 is often desirable because this further ensures that the fluid flowing from the component 1 into the component 2 causes the conduit 3 to assume a predetermined axial position in which the end face 11 abuts the stop or shoulder 14.

The structure of FIGS. 1 to 3 can be put to use in the following way:

It is assumed that the first component 1 is a hollow shaft which is rotated at a speed $n_1$. It is further assumed that the second component 2 is rotated at a speed $n_2$. The O-ring 7 is deformed to such an 27 extent that it compels the conduit 3 to share all angular movements (if any) of the second component 2 and to thus compel the first component 1 to rotate relative to the parts 2, 3 if the speed $n_1$ departs from the speed $n_2$ and/or if the components 1, 2 are caused to rotate in opposite directions.

The tendency of the conduit 3 to share all angular movements of the second component 2 (i.e., not to rotate with the first component 1 if the latter rotates relative to the component 2 and/or vice versa) is further enhanced by the force-locking (frictional) engagement between the end face 11 and the shoulder 14. The finish of the end face 11 and/or shoulder 14 can be selected in such a way that it also enhances the tendency of the conduit 3 to share all angular movements of the second component 2 or to effectively resist any rotation with the first component 1 if and/or when the component 2 does not rotate.

As a rule, the relationships of rotational speeds $n_1$ (first component 1), $n_2$ (second component 2) and $n_3$ (conduit 3) are as follows:

1. $n_1 > n_2 = n_3$, or
2. $n_1 < n_2 = n_3$, or
3. $n_1 > n_2 = n_3 = 0$.

It is clear that the positions of the sealing 28 elements 7 and 9 can be reversed (or that the conduit 3 can be installed in inverted position) if the conduit is to rotate (including a rotation at zero speed) with the component 1 relative to the component 2. The diameters of the sockets 4 and 5 are then changed accordingly. All that counts is to employ between one of the two components and one end portion of the conduit a sealing element which performs the function of the split-ring piston packing 9, and to install between the other component and the other end portion of the conduit a sealing element which performs the function of the Oring 7. It is immaterial whether the one and/or the other component rotates, whether the one or the other component does not rotate, or whether one of the components rotates at a speed greater than that of the other component or vice versa.

An additional advantage of the combination of the components 1, 2, conduit 3 and sealing elements 7, 9 is that the rate of leakage is relatively low because the escape of fluid, if any, is limited to the region of the packing 9.

Furthermore, the sealing action of the O-ring 8 remains unchanged for long periods of time because the O-ring and the adjacent portions of the component 2 and conduit 3 do not turn relative to each other. The wear upon the packing 9 and the adjacent portions of the component 1 and conduit 3 is relatively low because the conveyed fluid (such as oil) can adequately lubricate the surfaces which can turn relative to each other.

The provision of the shoulder 14 not only establishes a direct frictional engagement between the component 2 and the conduit 3 (to thus even further reduce the likelihood of rotation between the conduit and the component 2) but the shoulder 14 also serves as a means for locating and maintaining the conduit in a predetermined (optimal) axial position relative to the component 2 (as well as relative to the component 1 if the components 1 and 2 are maintained at a fixed axial distance from each other). As already explained hereinbefore, the fluid which flows from the component 1 into the conduit 3 and bears upon the end face 10 causes the end face 11 to abut the shoulder 14 whereby the shoulder 14 ensures that, from then on, the axial position of the conduit 3 relative to the component 2 remains unchanged.

The component 1 can constitute a hollow shaft of a transmission (such as a CVT), and the component 2 can constitute a housing or case (or a portion of a housing or case, or a part which is attached to the housing or case) of a transmission. FIGS. 4 and 4a illustrate certain details of hydraulic controls for the starting clutch 20 in the automated transmission 99 for use in the power train of a motor vehicle, e.g., to receive torque from a friction clutch or any other suitable torque transmitting system (e.g., a torque converter) which can receive torque from the internal combustion engine or another suitable prime mover of the vehicle) and to drive the wheels of the vehicle by way of a differential or the like. The structure of FIG. 1 can be utilized to admit a pressurized hydraulic fluid to a chamber 23 of a cylinder or housing 24 of the starting clutch 20.

Alternatively, a clutch which embodies or is combined with a novel structure of the type shown in FIG. 1 can be utilized in or in conjunction with an arrangement which is designed to change the direction of rotation (when necessary), e.g., with a reversing gear. Basically, the structure of FIG. 1 can be utilized with advantage in any system wherein a conduit is to convey a fluid medium from a suitable source through a first component to a second component and one of the two components can or should rotate relative to the other component (or vice versa) or the two components can rotate with or relative to each other in the same direction or in opposite directions.

As a rule (or at least in many instances), a starting clutch in an automated or automatic transmission comprises a package of lamellae or discs (shown at 21 in FIGS. 4 and 4a) which can be pressed against each other by an apply piston

(22) in response to the application of fluid pressure against the apply piston. The first, third, fifth, etc. discs of the package 21 are compelled to rotate with one of the two components, and the second, fourth, etc. discs are connected with a second component so that, when the neighboring discs are urged against each other, the first component can transmit torque to the second component or vice versa. The magnitude of the torque which the clutch can transmit depends upon the magnitude of the force which the piston applies to the nearest disc.

When the magnitude of the torque being transmitted by the starting clutch 20 is to decrease, the hydraulic fluid must be free or must be caused to rapidly flow from the chamber 23 next to the apply piston 22 toward and into a reservoir, e.g., into a sump which supplies fluid to a pump or another suitable source of pressurized fluid. To this end, the starting clutch normally comprises a suitable spring (particularly a diaphragm spring shown schematically at 29 in each of FIGS. 4 and 4a) which is installed in such a way that it can push the apply piston 22 away from the package 21 of clutch discs as soon as the fluid pressure in the chamber 23 at the other side of the piston 22 is reduced to an extent which enables the spring 29 to shift the piston axially and to thus expel fluid from the chamber 23.

Since the starting clutch must be disengaged (at times) while the apply piston 22 rotates, the diaphragm spring 29 must overcome the resistance which the piston 22 offers to axial movement in a direction away from the clutch discs (i.e., away from the package 21 of such clutch discs) as well as the centrifugal force which tends to move the circulating body of hydraulic fluid in the chamber 23 radially outwardly and to thus exert an additional force upon the radially outer portion of the piston 22 in a direction toward the package 21 and the diaphragm spring 29. In other words, the diaphragm spring 29 must overcome that portion of the force being applied (by fluid) against the piston 22 which is due to the pressure of fluid in the conduit 25 supplying pressurized fluid; to the chamber 23 as well as that portion of the force which is attributable to the action of centrifugal force tending to densify the fluid in the radially outer portion of the chamber 23.

The just discussed problem in connection with rapid evacuation of fluid from the chamber 23 for the purpose of disengaging the starting clutch 20, or of reducing the magnitude of the torque being transmitted by such clutch, can be overcome by utilizing a diaphragm spring 29 which stores a substantial amount of energy while the clutch 20 is engaged. This, in turn, necessitates the utilization of a highly pressurized fluid in order to maintain the starting clutch 20 in the engaged condition because such condition can be established and maintained by filling the chamber 23 with a hydraulic fluid at a pressure which suffices to prevent a displacement of the piston 22 in a direction to the right, as viewed in FIG. 4, namely to permit at least some angular displacements of the two sets of clutch discs relative to each other. This necessitates a corresponding pressure intensification or multiplication at the valve or valves which control the flow of fluid into and from the chamber 23.

The need for a high or very high pressure of fluid in the chamber 23 for the purpose of maintaining the clutch 20 in the engaged condition, together with the appurtenant need for pressure multiplication at the valve(s), creates a number of problems. For example, the operation of the clutch cannot be regulated as reliably and as rapidly when the fluid pressure in the chamber 23 must be very high while the clutch is fully engaged. Moreover, the clutch cannot be regulated as reliably and as accurately as when the fluid pressure is low in order to compensate for certain disturbances and other undesirable phenomena.

It is customary, for the reasons of safety, to install in the conduit (25), which supplies pressurized fluid from a source (such as the pump 60 shown in FIG. 4) to the chamber 23, a manually operated slide valve (selecting valve) 30 which selects the desired ratio (such as neutral, parking, reverse or forward) of the automated transmission. The purpose of the slide valve 30 is to ensure that the hydraulic fluid can be expelled from the chamber 23 when the transmission is shifted into neutral or parking. Such disengagement of the starting clutch 20 (when the transmission has been shifted into neutral or parking gear) is desirable in order to ensure that the motor vehicle cannot be set in motion while the transmission is in such (parking or neutral) gear.

The purpose of the various hydraulic controls which are shown in FIGS. 4 and 4a is to ensure that each engagement of the starting clutch 20 involves an optimal utilization of the full range of adjustments of the valve or valves (e.g., a magnetically operated valve) serving to regulate the preliminary fluid pressure, namely that the full range of adjustments can be used optimally for a regulation of the torque being transmitted by the starting clutch. An advantage of such mode of operation is that a pressure reducing slide valve 40 in the control system of FIG. 4 can be readily operated in such a way that its axially reciprocable valving element or spool 41 can be reliably biased by a valve spring (such as a coil spring 42) to a position in which the minimal fluid pressure in the chamber 23 of the starting clutch 20 corresponds to the initial stressing of the spring 42.

When the motor vehicle is in use, the fluid pressure in the chamber 23 is preferably reduced only to a value (the so-called creep point) at which the starting clutch 20 can cause the vehicle to crawl or creep. The aforementioned manually operated selecting slide valve 30 is installed in a composite conduit (62, 31, 25) between the pump 60 and the chamber 23 in such a way that it is located downstream of the pressure reducing slide valve 40, i.e., between the valve 40 and the starting clutch 20. As already mentioned above, the manually operated slide valve 30 ensures that the pressure of fluid in the chamber 23 drops rapidly when the transmission is shifted into neutral gear or into parking.

Another advantage of the hydraulic control system of FIG. 4 is that the pressure multiplication or intensification at the slide valve 30 need not be very pronounced which, in turn, simplifies the regulation of operation of the starting clutch 20 without affecting the accuracy, versatility and/or reliability of the regulation.

Figure 5:
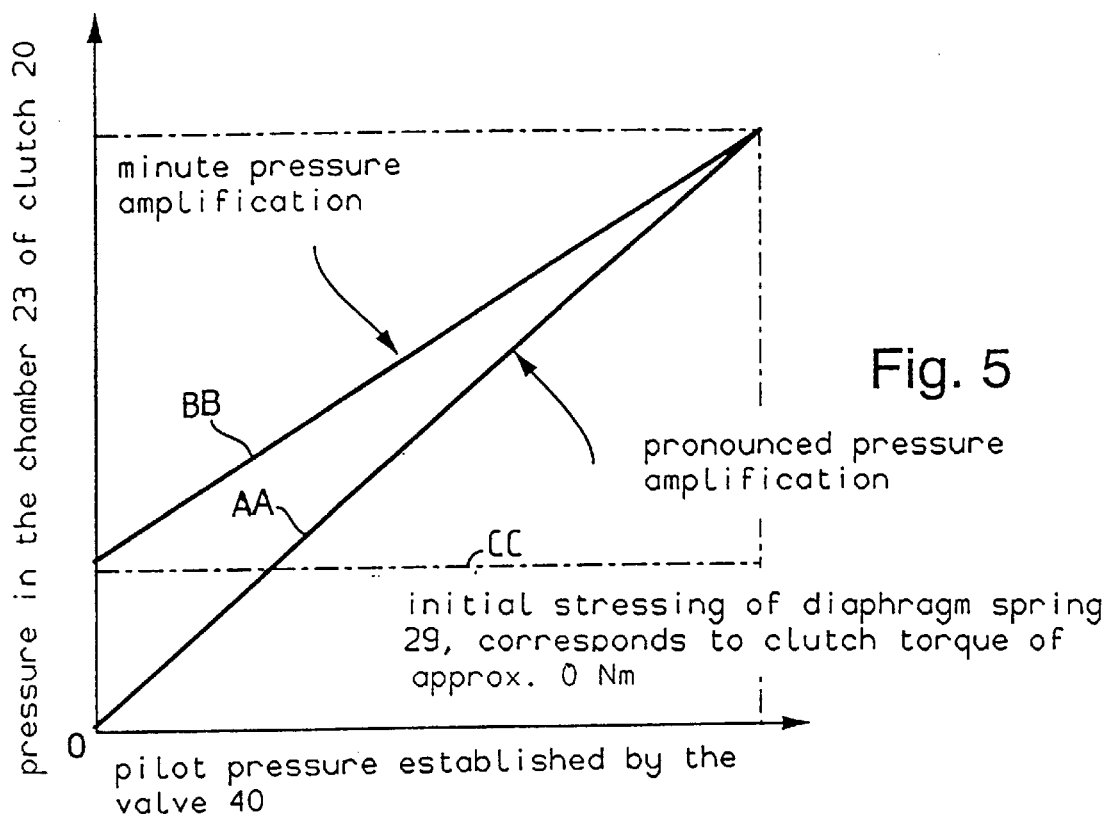
FIG. 5 shows a coordinate system wherein the curves represent the relationships between pilot pressures and clutch pressures of a hydraulic fluid.
Figure 6:
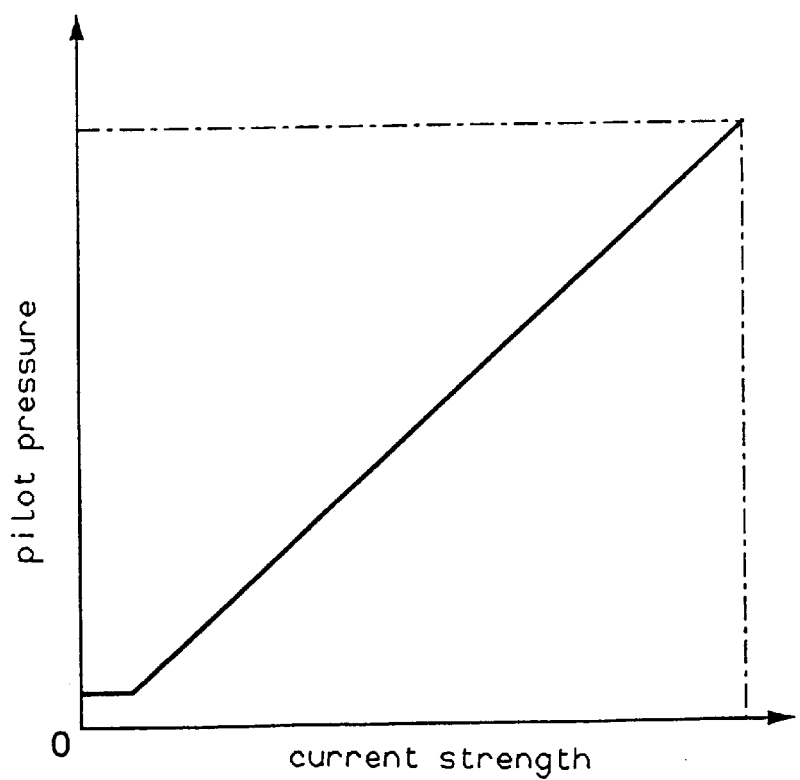
FIG. 6 shows a coordinate system wherein the curve represents changes of current strength for the regulation of a valve as a function of changes of the pilot pressure.

The coordinate system of FIG. 5 shows the relationship between the pilot pressure established by the pressure reducing valve 40 and the pressure in the chamber 23 of the starting clutch 20. The coordinate system of FIG. 6 shows the manner in which the pilot pressure depends upon the strength of the electric current being supplied to an electromagnetic valve of the control system shown in FIGS. 4 and 4a.

Referring again to FIGS. 4 and 4a, the starting clutch 20 comprises the package 21 of clutch discs which can be pressed against each other with a variable force by the apply piston 22 in dependency upon the pressure of hydraulic fluid in the chamber 23 of the cylinder or housing 24. The prestressed diaphragm spring 29 tends to move the piston 22 in a direction away from the package 21 of clutch discs, i.e., in a direction to expel fluid from the chamber 23. The volume of the chamber 23 (i.e., the quantity of hydraulic fluid in the cylinder 24) rises to a maximum value when the clutch 20 is fully engaged. At such time, the diaphragm spring 29 stores a maximum amount of energy.

FIG. 4 further shows friction linings 26 which flank the package 21, and a counterpressure plate 27. The diaphragm spring 29 is shown only schematically; as can be seen in FIG. 4a, this diaphragm spring can act upon the piston 22 radially inwardly of the package 21 of clutch discs. The conduit 25 connects the chamber 23 with the manually operable slide valve 30 which, in turn, is connected with the pressure reducing valve 40 by the aforementioned conduit 31. The conduit 62 connects the outlet of the pump 60 with the valve 40.

The valve 40 is designed to ensure abrupt evacuation of fluid from the chamber 23 when the transmission 99 is set in neutral (N) or park (P). This enhances the safety of operation of the power train including the transmission 99 because the motor vehicle cannot be set in motion due to rapid disengagement of the clutch 20 in response to shifting of the transmission into neutral gear or into parking.

When the valving element or spool of the valve 30 is shifted to D, the conduit 25 communicates with the conduit 31, i.e., the conduit 25 can receive fluid at a pressure determined by the valve 40. The latter has a first inlet (e.g., a port) E1 for the admission of fluid at a control or pilot pressure determined by an electromagnetic pilot or control valve 50, and a second inlet E2 in the form of a port for reception (from the pump 60) of hydraulic fluid at the full system pressure (namely by way of the conduit 62). A third inlet E3 in the form of a port can receive fluid from an outlet A (e.g., a port) by way of a feedback conduit 45 and admits such fluid into a chamber or compartment 40b of the valve housing or body 40a. The outlet A supplies fluid to the inlet of the conduit 31 and transmits fluid at the pressure which is to prevail in the chamber 23.

The transmission 99 of FIG. 4a comprises a rotary input shaft 98 which is rotatable within the transmission housing or case 98a in antifriction ball bearings 97. The starting clutch 20 spacedly surrounds the input shaft 98 and, in addition to the aforementioned parts, comprises a radially inner carrier or holder 95 for one set of clutch discs in the package 21. A radially outer carrier or holder 94 non-rotatably supports the other set of clutch discs, and such discs alternate with the discs of the one set. A plate 96 non-rotatably secures the holder 95 to the input shaft 98. The other carrier or holder 94 is non-rotatably connected with an output element 93 (such as a spur gear) of the transmission 99. Thus, when the starting clutch 20 is engaged, the flow of power is from the shaft 98, through the holder 95, the discs of the package 21, the holder 94, and on to the gear 93.

The energy storing device (diaphragm spring) 29 acts upon the apply piston 22 in a direction to disengage the starting clutch 20. FIG. 4a further shows the conduit 25 (e.g., corresponding to the conduit 3 of FIG. 1) having a first end portion which is received in a socket of the rotary input shaft 98 (corresponding to the first component 1 of FIG. 1) and a second end portion non-rotatably mounted in a socket 89 of the transmission case 98a. The axial passage of the conduit 25 delivers pressurized fluid to the chamber 23 in the cylinder 24 of the starting clutch 20.

Referring again to FIG. 4, the inlet E1 is connected with the outlet of the control valve 50 (e.g., an electromagnetic valve) by a conduit 51. The valve 50 receives signals from an electronic control unit (schematically shown at 50A) which controls the current flowing in the electromagnet of the valve 50. This ensures that the conduit 51 supplies to the inlet E1 of the pressure reducing valve 40 a supply of fluid at the pilot pressure. The pressure of fluid which is supplied by the pump 60 into a conduit 61 is reduced in a pressure reducing valve 70 which is connected with the conduit 51 by a further conduit 63. The valve 70 is set up to supply to the conduit 63 fluid at a constant pressure (e.g., 5 bar). The valve 50 changes such pressure in accordance with signals from the control unit 50A so that the conduit 51 delivers to the inlet E1 a hydraulic fluid at the pilot pressure. For example, the pressure (5 bar) of fluid in the conduit 63 can be modified by the electromagnetic control valve 50 to a pilot pressure (e.g., between 0 bar and 5 bar), depending on the current which is selected by the control unit 50A. The control unit 50A can comprise suitable software and selects the current for the electromagnet(s) of the control valve 50 as a function of one or more parameters, e.g., the position (inclination) of the flap forming part of the throttle valve for the engine in the power train of the motor vehicle wherein the power train further includes the transmission 99. For example, the valve 50 can lower the constant pressure of fluid which is supplied by the conduit 63 in that it discharges a predetermined quantity of such fluid into a sump 52. The valve 50 can comprise a reciprocable valving element or spool, and the axial position of such spool determines the rate of evacuation of fluid from the conduit 63 into the sump 52. This ensures that the pressure of fluid in the conduit 51 and at the inlet E1 matches the pilot pressure selected by the control unit 50A, e.g., a pilot pressure which is less than the constant pressure of the fluid in the conduit 63.

The spool 41 of the pressure reducing valve 40 is biased by the coil spring 42 which reacts against the housing or cylinder of the valve 40. It is clear that the coil spring 42 can be replaced with other suitable biasing means. The spring 42 bears against the adjacent end face S1 of the spool 41. The arrangement is such that, before it reaches its right-hand end position, a shoulder 44 of the spool 41 establishes communication between the inlet E2 (i.e., the discharge end of the conduit 62) and the outlet A so that the outlet A discharges fluid at full system pressure, and such fluid flows in the feedback conduit 45 to the inlet E3 to exert a pressure against a shoulder S2 of the spool 41. Thus, the full system pressure acting upon the shoulder S2 opposes the bias of the coil spring 42. This causes the spool 41 to move in a direction to the left (as viewed in FIG. 4) until the shoulder 44 interrupts the communication between the inlet E2 and the outlet A (and conduit 45). At such time, the pressure of fluid in the chamber 23 of the starting clutch 20 matches the pilot or control pressure at the inlet E1 plus the bias of the spring 42.

The operation of the transmission 99 is as follows:

The fluid pressure during initial filling of the chamber 23 of the starting clutch 20 (or during emptying of such chamber) need not be regulated with a high degree of accuracy. The reason is that, at such time, the clutch 20 is not called upon to transmit any torque. The spool 41 in the housing or body 40a of the pressure reducing valve 40 is biased only by the coil spring 42 to a position in which the (minimal) pressure of fluid in the chamber 23 of the starting clutch 20 is dependent upon the bias of the diaphragm spring 29 which acts upon the piston 22 in a sense to move the piston axially away from the counterpressure plate 27, i.e., to expel fluid from the chamber 23. The pilot pressure which is established by the electromagnetic control valve 50 is zero.

When the motor vehicle is in use, the control unit 50A receives and transmits signals which cause the control valve 50 to initiate an engagement of the starting clutch 20. Thus, the pilot pressure at the inlet E1 of the valve 40 is caused to rise from zero pressure whereby the fluid which is supplied by the conduit 51 acts upon the shoulder S1 of the spool 41 and causes the latter to move in a direction to the right (as viewed in FIG. 4) so that the conduit 31 receives (from the conduit 62) a stream of fluid at a rate determined by the bias of the spring 42 plus the (pilot) pressure of fluid upon the shoulder S1 of the spool 41. When the desired pressure in the chamber 23 is reached, the fluid (supplied by the conduit 45) acts upon the shoulder S2 of the spool 41 so that the flow of pressurized fluid from the inlet E1 to the outlet A is interrupted. At such time, the pilot pressure can be utilized immediately for the transmission of torque. In other words, and in contrast to presently known teachings, no time is lost to first fill the chamber 23 with fluid when the operator of the motor vehicle decides to depress the gas pedal and/or to shift the transmission 99 into reverse or into a forward gear.

In normal operation of the motor vehicle, the fluid pressure in the chamber 23 of the starting clutch 20 can only be reduced to a value which is still sufficient to cause the vehicle to creep or crawl because such creeping takes place while the diaphragm spring 29 assumes a prestressed condition. This is attributable to the bias of the spring 42 upon the spool 41 of the pressure reducing valve 40.

In the coordinate system of FIG. 5, the pilot pressure (control valve 50) is measured along the abscissa, and the pressure in the chamber 23 of the starting clutch 20 is measured along the ordinate. The curve AA indicates the pronounced rise of fluid pressure (this must be effected by a valve corresponding to the valve 40 in FIG. 4) in accordance with prior proposals (because the initial pilot pressure is zero). The curve BB indicates the much more gradual rise of fluid pressure in the transmission 99 of the present invention; the reason is that the initial pilot pressure is above zero. Thus, the spring 42 cooperates with the control valve 50 to maintain the spool 41 in an axial position which ensures that the initial fluid pressure in the chamber 23 (see the line CC) is well above zero. The entire pilot pressure range (normally between 0 bar and 5 bar) can be utilized for the transmission of torque.

Regardless of the momentary axial position of the spool 41 (i.e., the position determined by the bias of the spring 42 plus the (pilot) pressure of fluid upon the shoulder S1, the fluid system pressure upon the shoulder S2, and the difference between the areas of the shoulders S1 and S2), it applies that the pressures of fluid acting upon the shoulders S1 and S2 balance or neutralize each other if the communication between the outlet A and the inlet E2 of the housing of the valve 40 is to be interrupted.

FIG. 6 shows the dependency of the pilot pressure (measured along the ordinate) upon the strength of the current being supplied by the electromagnet(s) of the pilot valve or control valve 50.

Figure 7:
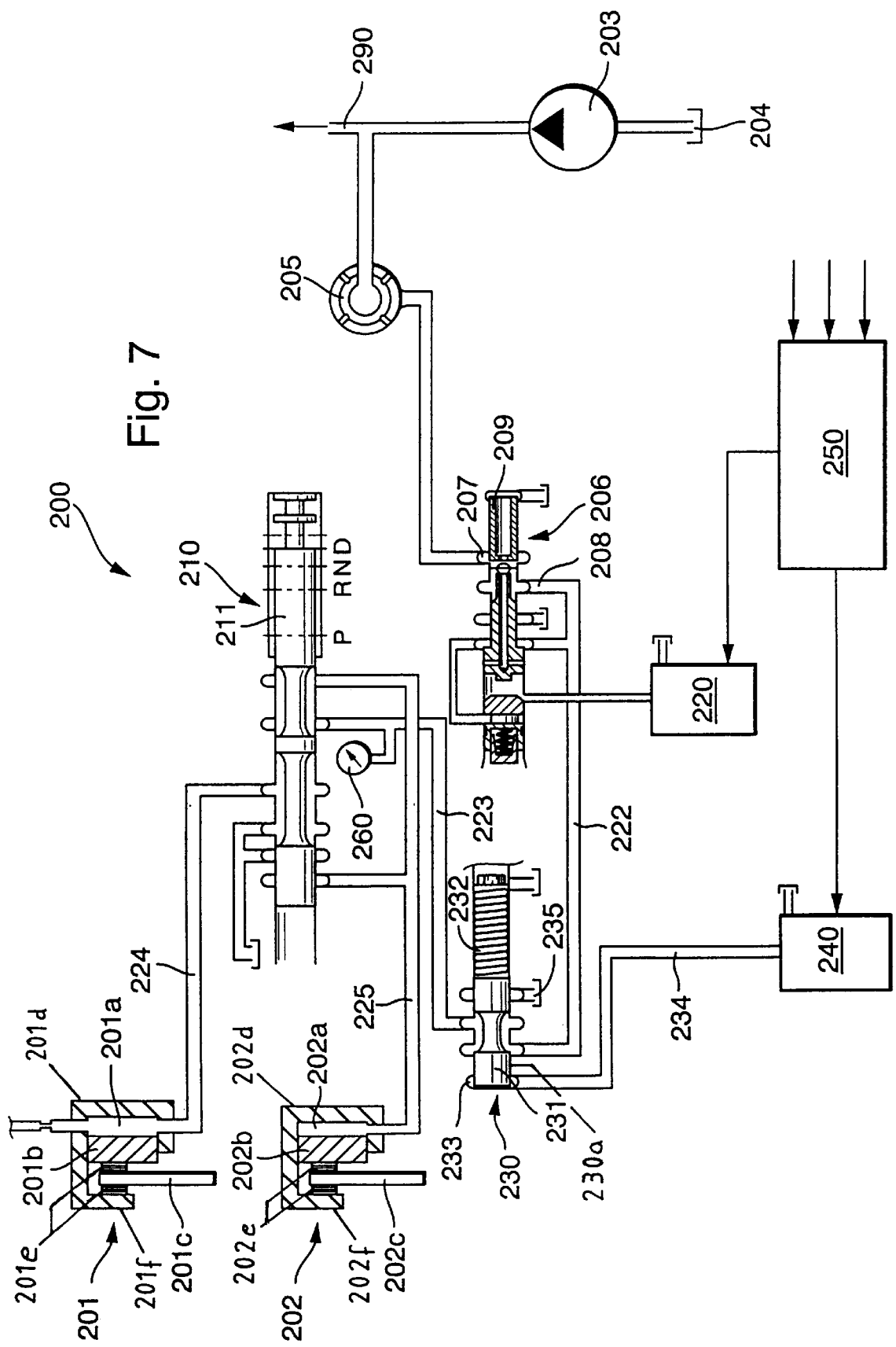
FIG. 7 is a schematic partly sectional view of two fluid-operated clutches for use in a transmission and of a hydraulic clutch operating system.

FIG. 7 shows a fluid-operated actuating arrangement for a composite starting clutch 200 in an automated transmission. The composite starting clutch 200 comprises a reverse drive disc clutch 201 and a forward drive disc clutch 202. The clutches 201 and 202 are operated hydraulically by way of a manually manipulatable selecting valve 210 having a reciprocable valving element or spool 211 in a suitable housing or body (not referenced). The selected axial position of the spool 211 determines the selection of the clutch 201 or 202, i.e., whether a first conduit 224 supplies hydraulic fluid to a chamber 201a of the clutch 201 or a second conduit 225 supplies hydraulic fluid to a chamber 202a of the clutch 202. The exact pressure of hydraulic fluid which is being supplied to the conduit 224 or 225 is selected by a pressure regulating valve 206 which receives fluid at system pressure from a pump 203 by way of a conduit leading to an inlet 207.

The construction of the selecting valve 210 (here shown as a slide valve) is such that, when the valving element or spool 211 assumes a position in which the conduit 224 supplies fluid to the clutch 201, the clutch 202 cannot receive pressurized fluid, and only the conduit 225 receives fluid when the clutch 202 is to be engaged. In other words, the clutch 201 can be engaged only when the clutch 202 is disengaged, and vice versa.

The pump 203 draws hydraulic fluid from a source 204 (e.g., a sump or another reservoir), and such fluid must pass through a filter 205 on its way toward the inlet port 207 of the housing or body of the adjustable pressure regulating valve 206. An outlet port 208 of the adjustable valve 206 can admit fluid into a conduit 222 leading to one inlet port of an adjustable safety valve 230 which, in turn, controls the flow of fluid in a conduit 223 on to the manually operated transmission ratio selecting slide valve 210.

The axial position of the spool 209 of the pressure regulating valve 206 is determined by an adjustable control (pilot) valve 220 which determines the establishment and the interruption of communication between the ports 207 and 208. The control valve 220 determines the fluid pressure at the outlet port 208 of the valve 206, i.e., the pressure of fluid to be conveyed to the disc clutch 201 or 202, depending on the axial position of the spool 211. This, in turn, determines the extent of engagement of the clutch 201 or 202, i.e., the magnitude of the torque which the selected clutch 201 or 202 can transmit.

Under normal circumstances, the safety valve 230 determines whether or not the fluid supplied by the conduit 222 can enter the conduit 223 and (by way of the valve 210) the conduit 224 or 225 to the plenum chamber 201a or 202a, respectively. On the other hand, the valve 206 cooperates with the control or pilot valve 220 to select the pressure of fluid in the conduit 222, i.e., the extent of engagement of the clutch 201 or 202. The engaged clutch 201 or 202 cannot be disengaged in the event of a malfunctioning of the pressure regulating valve 206.

The operation of the safety valve 230 is controlled by a pilot valve or control valve 240 which determines the pilot pressure in a conduit 234 and hence in a chamber 233 of a left-hand end of the spool 231 in the housing or body 230a of the valve 230. The aoperation of the control valve 240 is regulated by an electronic control unit 250 which also controls the operation of the control valve 220. The control unit 250 has several inputs for signals from various monitoring means, e.g., from sensors which monitor selected parameters of the engine and/or motor vehicle.

The spool 231 of the safety valve 230 is biased by an energy storing device 232, e.g., a coil spring, which opposes axial movements of the spool 231 in response to admission of pressurized fluid into the chamber 233. In FIG. 7, the spool 231 is maintained in an axial position in which it permits a fluid (e.g., oil) to flow from the conduit 222 into the conduit 223. If the pilot pressure of fluid in the conduit 234 and chamber 233 is increased, the spring 232 yields and permits the spool 231 to assume an axial position (to the right of the position shown in FIG. 7) in which the path for the flow of fluid from the conduit 222 into the conduit 223 is interrupted. At the same time, the spool 231 establishes a connection between the conduit 223 and the sump (at 235) so that the previously engaged clutch 201 or 202 becomes disengaged.

The clutches 201, 202 respectively comprise housings 201d, 202d for reciprocable pistons 201b, 202b and packages 201c, 202c of clutch discs with pairs of friction linings 201e, 202e. When the clutch 201 or 202 is engaged, the respective package (201c or 202c) of clutch discs is urged against the adjacent counterpressure plate 201f or 202f so that the discs of the package 201c or 202c cannot rotate relative to each other or can slip relative to each other only to the extent determined by the desired extent of engagement of the clutch 201 or 202.

The pressure of fluid in the conduit 223 is monitored by a suitable sensor (e.g., a pressure gauge) 260.

Figure 8:
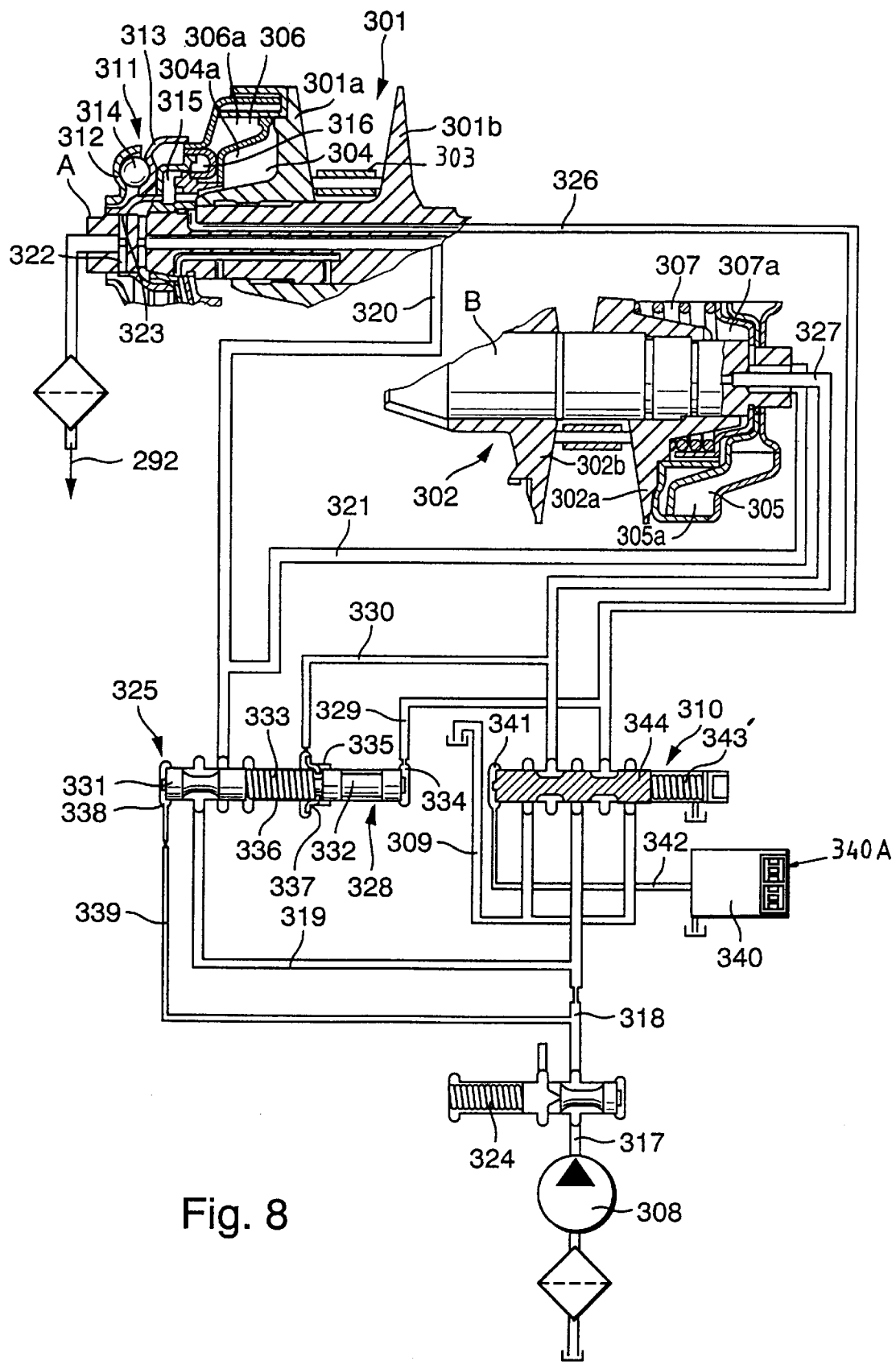
FIG. 8 is a fragmentary axial sectional view of a continuously variable transmission and of a hydraulic operating system for the clutch and for several actuators in the transmission.

The conduit 290 of FIG. 7 serves to convey fluid at system pressure (i.e., from the outlet of the pump 203) to the hydraulic controls of a transmission, e.g., a continuously variable transmission (CVT) of the type shown in FIG. 8. The conduit 317 and the pump 308 of FIG. 8 respectively correspond to the conduit 209 and pump 203 of FIG. 7. The conduit 317 of FIG. 8 serves to supply pressurized fluid which is utilized to adjust the sheave or pulley 301 or 302 in the continuously variable transmission of FIG. 8.

If the forward drive clutch 202 of FIG. 7 is engaged, the spool 211 of the valve 210 permits hydraulic fluid to flow through the conduit 225 and into the chamber 202a to shift the piston 202b against the adjacent friction lining 202e with a force which is required to enable the clutch 202 to transmit torque of a selected magnitude (as determined by the pressure regulating valve 206).

If the pressure regulating valve 206 is damaged or fails to function properly for any other reason, the pressure of fluid in the conduit 222 no longer corresponds to that pressure which is required to enable or cause the clutch 201 or 202 to transmit torque of a desired magnitude. This could result in damage to the prime mover or could cause an accident. At such time, the control valve 240 causes the fluid pressure in the conduit 234 and in the chamber 233 of the safety valve 230 to rise so that the conduit 223 communicates with the sump 235 and the clutch 201 or 202 is automatically disengaged.

The aforementioned inputs (shown but not referenced) of the control circuit 250 can receive one, two, three or many more signals from suitable sensors and/or electronic circuits. For example, the control unit 250 can receive signals from a sensor which monitors the speed of the motor vehicle (e.g., by monitoring the RPM of one of the wheels), the RPM of a flywheel forming part of a clutch which drives the input shaft A (FIG. 8) of the continuously variable transmission, the RPM of the output shaft of such transmission, the position of the gas pedal, the extent of application of the brake(s), the position (such as the inclination) of the flap of the throttle valve in the engine, and/or others. The sensor 260 of FIG. 7 can also be set up to transmit to an input of the control unit 250 signals denoting the pressure of fluid in the conduit 223, i.e., the pressure of fluid in the chamber 201a or 202a (depending on the position of the spool 211 in the body or housing of the selecting valve 210).

The safety valve 230 of FIG. 7 is installed downstream of the pressure regulating valve 206 and upstream of the selecting valve 210 (as seen in the direction of fluid flow from the source 203 of pressurized fluid to the clutch 201 or 202). However, it is also possible to employ two safety valves one of which can influence the fluid pressure in the conduit 224 and the other of which can influence the fluid pressure in the conduit 225. The arrangement of FIG. 7 (which employs a single safety valve 230) is preferred at this time because it entails savings in space and material and is considered to be just as effective as two discrete safety valves, one for each of the conduits 224 and 225.

Referring now to FIG. 8, the continuously variable transmission comprises the two adjustable pulleys 301, 302 and an endless flexible element 303 (e.g., a belt or a chain) which is trained over the two pulleys. The pulley 301 rotates with the input shaft A, and the pulley 302 rotates with the output shaft B. The pulley 301 has an axially fixed flange 301b and an axially movable flange 301a. Analogously, the pulley 302 has an axially movable flange 302a and an axially fixed flange 302b.

An actuator 304 is provided to adjust the axial position of the flange 301a relative to the axially fixed flange 301b, and a second actuator 305 serves to select the axial position of the axially adjustable flange 302a relative to the axially fixed flange 302b. Each of the actuators 304, 305 preferably comprises a fluid-operated motor, e.g., a single-acting or double-acting cylinder and piston assembly. The actuators 304, 305 can serve to urge the respective axially movable flanges 301a, 302a against the adjacent portions of the endless flexible element 303 (e.g., a chain).

The actuator 304 operates in parallel with a third actuator 306 (here shown as a third cylinder and piston assembly), and the actuator 305 operates in parallel with a fourth actuator 307 (also shown in the form of a cylinder and piston assembly). The purpose of the actuators 306, 307 is to select the ratio of the continuously variable transmission; these actuators respectively comprise plenum chambers 306a, 307a for supplies of a hydraulic fluid (such as oil). The plenum chambers 306a, 307a can receive fluid from the pump 308, or they can discharge fluid into an evacuating conduit 309 leading to a sump. The ratio of the transmission is changed by admitting pressurized fluid into one of the chambers 306a, 307a to increase its volume while, at the same time, permitting a corresponding quantity of fluid to escape from the other chamber. The flow of fluid into and from the chambers 306a, 307a is controlled by a regulating valve 310, such as a slide valve having an axially movable valving element or spool 344 biased by a coil spring 343 and being adjacent a chamber 341.

The transmission of FIG. 8 further comprises a hydromechanical torque sensor 311 serving to generate a pressure which is dependent at least upon the magnitude of the transmitted torque. This torque sensor 311 is mounted in such a way that the entire torque supplied by the input shaft A is transmitted to the first pulley 301. As shown, the torque sensor 311 comprises an axially fixed cam disc 312 which has limited freedom of rotation relative to the input shaft A, and a second cam disc 313 which is movable in the axial direction of but cannot rotate relative to the shaft A. The cam discs 312, 313 have confronting ramps (not referenced) abutting one or more spreading or expanding elements 314 in the form of spheres.

In order to guarantee the establishment of a modulated pressure which is a function at least of the transmitted torque and which is required to adequately tension the continuously variable transmission, the pump 308 is connected with a plenum chamber 315 of the torque sensor 311 by conduits 318 and 319. Furthermore, the outlet of the pump 308 is connected, by way of a conduit 321 which branches off the conduit 320, with the plenum chamber 307a of the actuator 307 at the second pulley 302.

The chamber 315 of the torque sensor 311 is permanently connected with the plenum chamber 304a of the actuator 304 by one or more channels. The input shaft A is provided with at least one axially extending fluid discharging channel (e.g., a bore) which communicates or which can be communicatively connected with the chamber 315. The fluid which leaves the chamber 315 of the torque sensor 311 by way of a flow restrictor 323 and port 322 can be utilized as coolant and/or lubricant for certain component parts of the power train employing the transmission of FIG. 8.

The cam disc 313 of the torque sensor 311, which is movable axially of the input shaft A, has a radially inner portion which can regulate the outflow of fluid via port 322 in dependency at least on the magnitude of transmitted torque. In other words, the radially inner portion of the cam disc 313 can be said to form part of a valve or a flow restrictor for the fluid which is to enter the port 322. The extent to which the inlet of the port 322 is exposed for admission of fluid depends on the axial position of the cam disc 313, i.e., at least upon the magnitude of the torque being transmitted between the cam discs 312 and 313. This ensures that the pressure of fluid which is supplied by the pump 308 and fills the chamber 315 of the torque sensor 311 is indicative, at the very least, of the magnitude of transmitted torque, namely of the torque being supplied by the shaft A to the torque sensor 311 and being transmitted by the torque sensor to the pulley 301.

Since the chamber 315 communicates with the chamber 304a (by way of the conduits 320, 321) and also with the chamber 305a, the pressure of fluid in the chambers 304a, 305a at least approximates that in the chamber 315. Due to the fact that the actuators 304, 305 operate in parallel with the respective actuators (cylinder and piston assemblies) 306, 307, the forces which act upon the the axially movable flanges 301a, 302a of the pulleys 301, 302 in response to a rise of fluid pressure in the chamber 315 are added to the forces acting upon the flanges 301a, 302a in response to fluid pressure prevailing in the chambers 306a, 307a and serving to select or alter the ratio of the transmission.

The pressures of fluid in the chambers 315 and 316 are being applied in parallel, and such fluids can communicate with or can be sealed from each other, depending upon the selected ratio or change of ratio of the transmission. The establishment or lack of communication between the chambers 315 and 316 depends upon the axial position of the flange 301a relative to the shaft A. In other words, the flange 301a can act as a valving element which controls the flow of fluid into and from passages in the form of channels machined into the shaft A. It is desirable to ensure that the entire range of shifting the transmission for operation with a decreasing ratio (shifting into lower gear) merely involves the presence of pressurized fluid only in the chamber 315.

The establishment of communication between the chambers 315, 316 can take place at least approximately simultaneously with the transition into the "rapid" stage of the range of the transmission. For example, it can be of advantage to select the timing of the establishment or interruption of communication between the chambers 315, 316 to coincide, at least substantially, with the setting of a transmission ratio of one-to-one. Thus, the torque sensor 311 can ensure the establishment of a transmission ratio-dependent pressure modulation which is superimposed upon a torque-dependent pressure modulation. In actual practice, this amounts to the achievement of a two-stage transmission ratio-dependent modulation of the pressure or pressure level.

Based on the preceding description of the construction and mode of operation of the transmission, one can arrive at the conclusion that, within the entire stage of the transmission range in which the transmission shifts to lower-speed operation (underdrive), the axial force which develops at the ramps of the cam discs 312, 313 is taken up exclusively, or at least primarily, by the axially effective surface in the plenum chamber 315. On the other hand, when the transmission operates within that portion or stage of its range of operation in which the transmission effects an acceleration (overdrive), the axial force which develops at the ramps and acts upon the disc 313 is taken up by the axially effective surfaces in the chambers 315, 316. Thus, and assuming that the input torque is the same, a shifting into operation at a lower speed entails that the pressure generated by the torque sensor 311 is higher than that which the torque sensor generates while the transmission shifts into operation at a higher speed. In accordance with a presently preferred embodiment, the transmission can be set up in such a way that the shifting or switching point at which the chambers 315, 316 begin or cease to communicate with each other is at a transmission ratio of approximately one-to-one.

As concerns further structural and operational features of a continuously variable transmission which employs two adjustable pulleys or sheaves and a chain or belt trained over such pulleys or sheaves, as well as a torque sensor, reference may be had to published German patent application No. 44 43 332.8 which describes and shows several embodiments of such transmissions and torque sensors. It is also possible to employ other types of presently known torque sensors. For example, the efficiency of the transmission can be enhanced if one employs a torque sensor which can effect a two-stage, three-stage or even infinitely variable modulation of the pressure in dependency upon the transmission ratio or upon changes of the transmission ratio.

As can be seen in FIG. 8, the actuators 304, 305 and 306, 307 and the torque sensor 311 receive fluid from a common source, i.e., from a single source (namely the pump 308). The pump 308 is followed by an optional volumetric flow control valve 324. For example, the valve 324 can be omitted if the pump 308 is a variable-volume pump the output of which varies in dependency upon changing fluid requirements.

The valve 324 is followed by the aforementioned regulating valve 310 which can be operated to change the ratio of the continuously variable transmission, and the valve 310 cooperates with the pressure regulating valve 325. As already explained hereinbefore, the valve 325 is connected between the conduits 318, 319 (upstream) and 320 (downstream); this valve 325 regulates the fluid pressure in the conduit 319 (i.e., upstream of the valve 310) in such a way that the pressure in the conduit 319 (and at the corresponding inlet of the housing or body of the valve 310) is higher than the required higher pressure of the two working pressures in the conduits 326, 327 leading from the valve 310 to the respective actuators 306 and 307.

The conduit 320 connects the pressure regulating valve 325 with the torque sensor 311 and, by way of this torque sensor, with the actuator 304. However, it is not always necessary that the flow of fluid from the valve 325 to the actuator 304 take place by way of the torque sensor 311. The pressure of fluid in the conduits 320, 321 and in the chambers 304a, 305a is dependent upon the pressure and the torque furnished by the torque sensor 311. In order to ensure a satisfactory operation of the tansmission, the pressure of fluid upstream of the regulating valve 310 (i.e., in the conduits 318, 319) is higher than the higher pressure which is required in the conduits 326, 327 and chambers 306a, 307a in order to shift the transmission into a different gear. The pressure which is required to change the ratio of the transmission can exceed the pressure which is furnished by the torque sensor 311. In other words, it could happen that (under certain circumstances of use of the motor vehicle and/or under certain operating conditions) the pressure which is established by the torque sensor 311 would be too low to ensure a rapid shifting of the transmission into a different ratio, such as is required or desirable for a satisfactory operation of the transmission and the entire power train.

For example, a critical situation can develop during braking of the motor vehicle while the engine torque is low or minimal. This entails a rapid deceleration of the vehicle and requires a rapid change of the transmission ratio. If the torque being transmitted by the torque sensor 311 is too low, the pressure of fluid leaving the torque sensor is too low, i.e., too low to ensure a required rapid change of the transmission ratio. In order to ensure that, even under the just outlined or analogous critical circumstances, the pressure in the conduits 318, 319 (i.e., upstream of the regulating valve 310), and hence also in at least one of the conduits 326, 327, will be sufficiently high whenever the need arises, the pressure regulating (increasing) valve 325 is installed between the torque sensor 311 (i.e., between the conduits 320, 321) and the valve 310 (i.e., the conduit 319). The thus installed valve 325 can ensure that the pressure in the conduit 319 and at the valve 310 exceeds (e.g., by a preselected value) the pressures in the conduits 326 and 327. For the just outlined purpose, the pressure regulating valve 325 is associated with or embodies a control means 328 which ensures that, when the operating conditions warrant it, the valve 325 performs at least one flow restricting or throttling operation upon the fluid flowing from the conduit 319 into the conduit 320. In the embodiment of FIG. 8, the control means 328 can be influenced or actuated by a feedback of pressures prevailing in the conduits 326 and 327.

A direct feedback takes place by way of the conduits 329, 330 which, on the one hand, communicate with the conduits 326, 327, respectively, and, on the other hand, are connected with a hydraulic OR-gate constituted by the control means 328. The valve 325 and the control means 328 respectively comprise discrete valving elements or spools 331 and 332 which are reciprocable in the respective valve housings or bodies and each of which can move axially independently of the other spool. A pin-shaped distancing element 333 is installed between the spools 331, 332, and the spool 332 is disposed between two chambers 334, 335 which communicate with the conduits 329, 330, respectively. The chamber 325 is located between the spools 331, 332 and receives the distancing element 333.

When the pressure in the conduit 327 (and hence also in the conduit 330) is higher than in the conduit 326, such pressure also prevails in the chamber 335 and acts upon the spool 331 of the pressure regulating valve 325. On the other hand, if the pressure in the conduit 326 (and hence also in the conduit 329) is higher than in the conduit 327, the pressure in the chamber 334 causes the spool 332 to move in a direction to the left, as viewed in FIG. 8; this causes the distancing element 333 to shift the spool 331 in the same (closing) direction. It will be seen that the control means 328 and its spool 332 act as an OR-gate, i.e., the force acting upon the spool 331 of the valve 325 is always indicative of the pressure in that one of the conduits 326, 327 in which the fluid pressure is higher.

The group of parts including the pressure regulating valve 325 and the control means 328 further comprises an energy storing device 336 in the form of a coil spring which is installed in a prestressed condition. This spring 336 reacts against a dished retainer 337 in the body or housing of the valve 325 (or in the body or housing of the control means 328) and bears upon the spool 331. The distancing element 333 is surrounded by the convolutions of the spring 336. The bias of this spring is selected in such a way that the pressure of fluid in the conduit 319 (and hence in the regulating valve 310) cannot drop below a preselected value. In other words, the pressure of fluid upstream of the valve 310 cannot drop below a certain threshold value.

A further chamber 338 in the housing or body of the valve 325 to the left of the spool 331 communicates with a conduit 339 leading to the conduit 318 and containing fluid under pressure matching that in the conduits 318, 319. In other words, fluid in the chamber 338 of the valve 325 applies a certain pressure against the left-hand end face of the spool 331, and such pressure opposes the bias of the spring 336. The conduit 339 and the chamber 338 ensure that a connection can be established to the conduits 320, 321 as well as to the torque sensor 311. Since the spool 331 is acted upon by fluid pressure at both end faces, it serves as a means for comparing the two pressures and for establishing or ascertaining a difference between the maximum pressures prevailing in the conduits 326 and 327 on the one hand, and the pressure prevailing in the conduits 318, 319 (i.e., upstream of the valve 310) on the other hand. In other words, the coil spring 333 (actually the valve 325 and the control means 328) can ascertain the maximum pressure in the conduits 318, 319 (upstream of the valve 310) as well as the desired differential between the maximum pressure prevailing in the conduit 326 or 327 and the pressure upstream of the valve 310.

The valve 310 is actuated by a control or pilot valve 340, and more particularly by the fluid pressure which is selected by the valve 340. To this end, the housing or body of the valve 310 is provided with the chamber 341 which is connected with the valve 340 by a conduit 342. The housing of the valve 310 further contains a restoring coil spring 343 acting upon that end face of the spool 344 of the valve 310 which is remote from the chamber 341. When the pressure in the chamber 341 is zero, the spring 343 is free to maintain the spool 344 in an axial position in which the valve 310 establishes communication between the conduit 327 and the conduit 309 leading to the sump, as well as a connection between the conduit 326 and the conduit 319 or 318. At such time, the fluid pressure in the conduit 327 is at least close to zero (due to communication with the sump via conduit 309) but the fluid in the conduit 326 is maintained at the full operating pressure established by the pump 308; this effects a shifting of the transmission in a direction toward overdrive.

The admission of pressurized fluid from the valve 340, via conduit 342, and into the chamber 341 of the valve 310 causes the spool 344 to move against the bias of the coil spring 343 (in a direction to the right, as viewed in FIG. 8) so that (and depending upon the pressure of fluid in the chamber 341) the spool 344 can assume any one of several positions. Thus, if the chamber 341 receives fluid at a maximum pressure, the spool 344 establishes communication between the conduit 327 and the conduit 318 (or 319) while at the same time connecting the conduit 326 with the outlet conduit 309, i.e., with the sump. Thus, the conduit 327 receives fluid at the full system pressure but the pressure in the conduit 326 is practically nil. This results in the selection of an underdrive.

If the pressure in the conduit 342 is changed (by the control valve 340), the conduit 326 can receive fluid at full system pressure and the pressure in the conduit 327 then at least approximates zero.

The pressures of fluid in the conduits 326, 327 can be varied to ensure the selection of a desired ratio for the continuously variable transmission. All this is accomplished by the control valve 340 which receives signals from a suitable electronic control unit 340A. Such control unit has several inputs for signals denoting certain parameters, for example, the RPM of the input shaft A, the RPM of the output shaft B, and/or certain others.

The circuitry of the control unit 340A compares and/or otherwise evaluates or processes the incoming signals and selects the pressure of the fluid in the conduit 342 (and in the chamber 341) accordingly. For example, in addition to and/or in lieu of signals denoting the RPM of the shaft A and/or B, the control unit 340A can receive signals denoting the position (the extent of depression) of the gas pedal in the motor vehicle, another mode of indicating the rate of fuel flow to and/or fuel consumption by the engine, the subatmospheric pressure in the suction manifold of the engine, the load upon the engine, and/or others.

The valve 310 can constitute a directional control valve, e.g., a ⁴⁄₃ valve having a spool with four control edges in the form of shoulders or the like. Furthermore, the illustrated hydraulic regulating valve 310 can be replaced with an electrically or pneumatically operated valve. It is also possible, and often preferred, to utilize a regulating valve which is an electromagnetically actuated directional control valve, and such valve can also employ resilient resetting means (e.g., one or more coil springs or other types of springs).

Similar observations apply as concerns the construction and mode of operation of one or more other valves in the controls for the transmission of FIG. 8. For example, the valve 324 or 325 and/or the control means 328 (which also constitutes or acts as a valve) can be replaced with different valves and/or control means. Furthermore, two or more valves of those numbered 310, 324, 325 and 328 can be combined into composite valves without departing from the spirit of the invention. By the same token, at least one of the valves 310, 324, 325 and 328 can be replaced with a set of two or more valves which jointly perform the functions of one of the illustrated valves. By way of example only, the valve 310 can be replaced with two valves one of which can connect the conduit 318 (319) with the conduit 326, and the other of which can connect the conduit 318 (319) with the conduit 327. As already mentioned above, the illustrated valve 310 constitutes or acts as a directional control valve.

Referring again to FIG. 4, the pressure reducing valve 40 in the hydraulic circuit of the starting clutch 20 can also constitute an electromagnetically operated proportional directional control valve, and this also applies for the electromagnetic control valve 50 of FIG. 4. For example, the valve 50 can comprise an electromagnet which receives current at a rate determined by the control unit 50A to select the characteristics of the fluid in the conduit 51. The current is utilized to select the position of a spool in the valve 50 in a manner to ensure that the valve 50 can control the operation of the pressure reducing valve 40 in a manner as already described with reference to FIG. 4.

Similar observations are valid for the valves 206, 230 and the associated valves 220 and 240 in the hydraulic circuitry of FIG. 7.

Different or excessive tolerances in connection with the making of various constituents of the hydraulic circuits and other parts shown in FIGS. 4–4a, 7 and 8 (such as the pump 60, 203 or 308, the starting clutch 20, 201 or 202, and/or the torque sensor 311) can entail that, if one relies on characteristic fields or curves (e.g., in connection with the selection of appropriate current by the control unit 50A or 340A for the valve 50 or 340) for predictable changes in torque transmission by a starting clutch, the utilization of identical currents in the electromagnets of different types of motor vehicles will result in the transmission of different clutch torques and/or in different clutch pressures. This lends additional importance to the pressure sensor (such as the sensor 260 in FIG. 7) which renders it possible to accurately ascertain the actual clutch pressure (namely the pressure which is required to maintain the clutch in a desired condition of engagement) and thus permits a continuous or sporadic detection of any or excessive departure of the measured value from the desired (rated) value of the clutch pressure. The thus detected deviations or departures can be used for an adaption or correction of the characteristic curves. This renders it possible to ensure that a current which has been selected on the basis of a characteristic curve will actually cause the application of an optimal clutch pressure, i.e., a proper engagement of the starting clutch.

The characteristic curve or curves which is or are stored in the microcontroller of the memory in a control unit can be adapted to ensure an accurate adjustment of various valves which control the fluid pressure in a starting clutch. The adaption ensures that, in a quasi stationary condition, the difference between the desired fluid pressure and the actual fluid pressure is at least close to zero. In other words, a pressure monitoring sensor (such as 260) renders it possible to carry out a correction of characteristic curves based on the characteristics of the vehicle in which the transmission employing one or more starting clutches is put to use.

Figure 9:
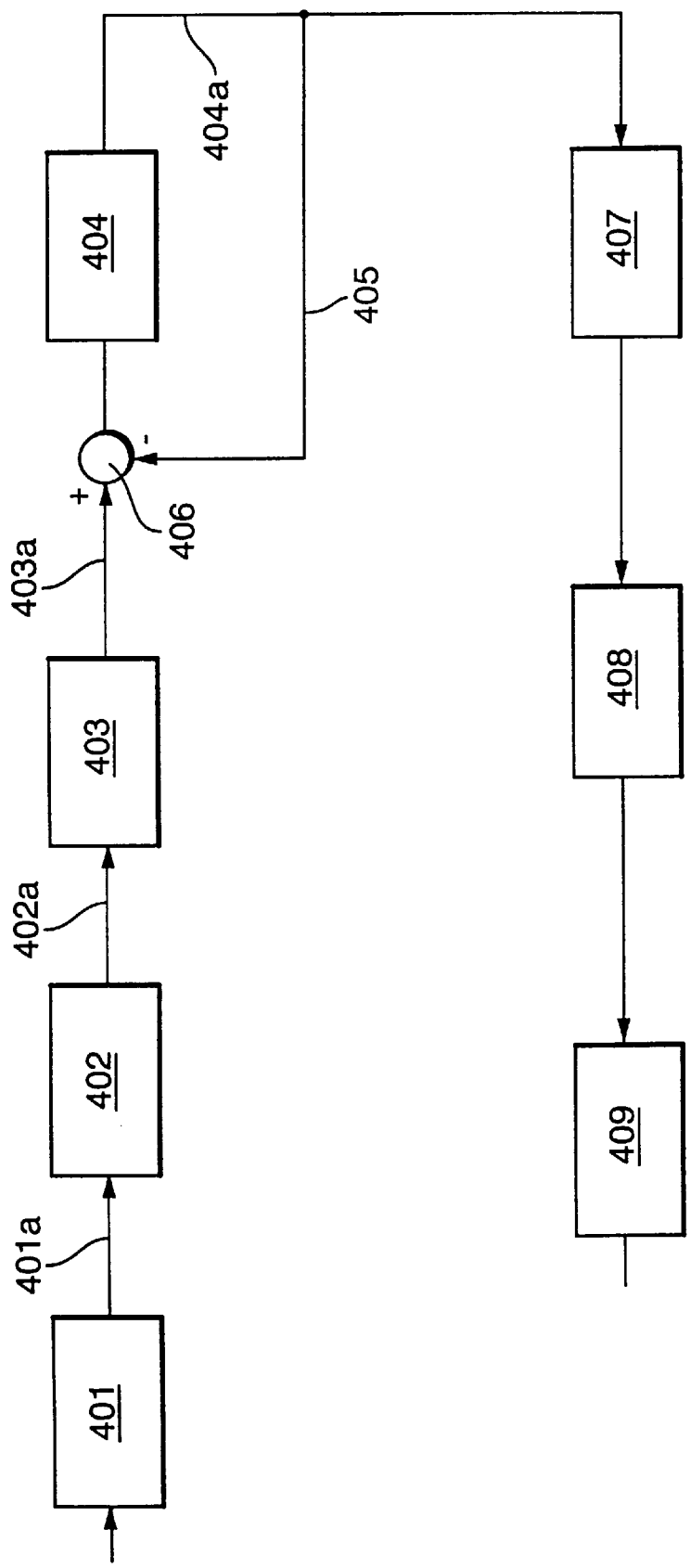
FIG. 9 is a block diagram showing various stages of a computerized clutch operating system for use in a transmission embodying one form of the invention.

The block diagram of FIG. 9 is representative of an adaption of characterstic curves in accordance with feature of the present invention. The block 401 denotes the step of determining a desired clutch torque 401a by resorting to a control unit and a control process which is implemented therein. The torque 401a is the torque which is to be transmitted by a starting clutch. The block 402 is representative of a calculation of a desired clutch pressure 402a by resorting to an inverse characteristic curve of the clutch. The next block 403 denotes a determination of a desired current value (strength) 403a on the basis of an inverse characteristic value curve, i.e., a conversion of the clutch pressure 402a into a desired current value 403a.

The block 404 denotes a conversion of the desired current value into an actual current value 404a by resorting to suitable current regulator means, such as a PI- or PID current regulator. The signal 404a is fed back at 405 to a subtracting circuit 406 and thence to 404. The block 407 denotes the supplying of current (404a) to a main slide valve (block 408) to select the actual clutch pressure. A wet clutch (block 409), such as a friction clutch immersed in oil or another fluid, selects a torque which can be transmitted by the clutch.

The just described adaption of characteristic curves pertaining to the valves renders it possible to correct the curve or curves which was or were memorized, in the course of a regulating procedure. Thus, the desired torque of the process and an inverse characteristic curve of the clutch (such inverse characteristic curve is stored separately for the reverse and forward drive clutches if the transmission employs two clutches, such as the clutches 201, 202 of FIG. 7) are employed jointly with an inverse characteristic curve for the valve to ascertain the corresponding desired or required current for the clutch regulating valve (such as an electromagnetic pilot or control valve). An actual current is generated with resort to a suitable current generator, such as a PI-regulator. The actual current ensures the establishment (in a hydraulic system employing at least one slide valve) of an appropriate (corresponding) pressure which can be transmitted by the clutch and which causes the clutch to generate a corresponding friction torque. If the actual pressure departs from the pressure which is desired for the application to the friction clutch, the actual pressure is employed to correct the inverse characteristic curve of the valve in such a way that the characteristic curve of the valve (such curve has been memorized in the course of the regulating operation) departs from the actual (existing) characteristic curve of the valve.

An adaption of the characteristic curve exhibits the important advantage that the reproducible characteristics which are typical of the system (such as, for example, tolerances of the valves and/or of the clutch) can be memorized and corrected as parameters which are characteristic of the system. As compared with regulation, an adaption exhibits the advantage that it is not necessary to await the development of a deviation or departure (of an actual value from a desired or required or optimum value) which is necessary to cause a regulator to react in order to carry out a correction.

Figure 10:
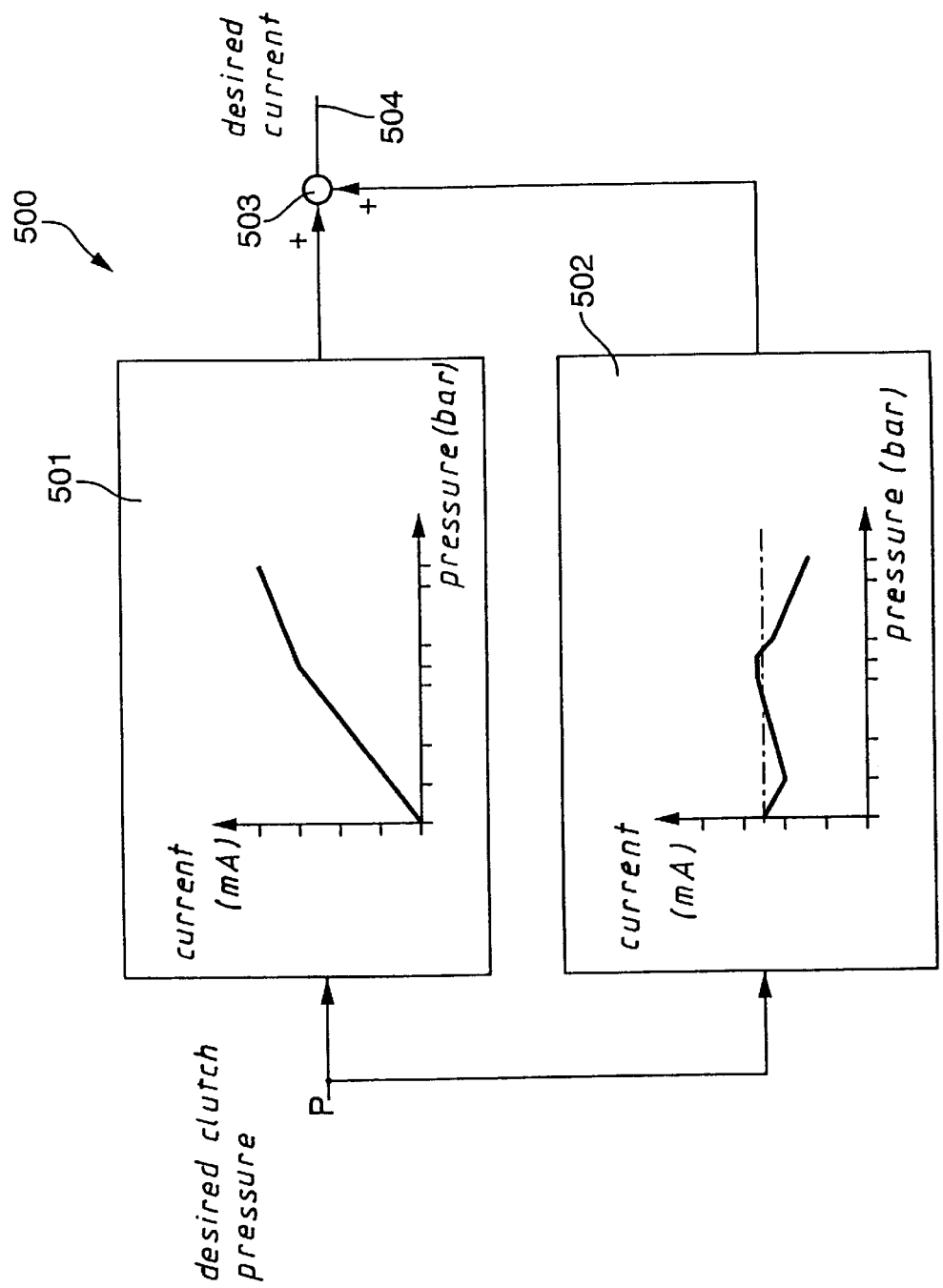
FIG. 10 is a diagram wherein the blocks denote the steps of adaption of a characteristic curve.

Referring to FIG. 10, there is shown a diagram 500 wherein the blocks denote the steps or stages of an adaption of a characteristic curve (such as the characteristic curve of a valve). The block 501 is representative of the step of applying a desired clutch pressure (in bar) in order to ascertain a corresponding current strength (in mA). The next block 502 denotes the ascertainment of an additive correction for the characteristic curve, the current strength being measured in mA and the pressure being measured in bar. The step denoted by the block 502 represents the determination of an additive current constant, and the corresponding signal is transmitted to a junction (signal comparing stage) 503 which further receives a signal denoting the summand (addend) from 502. The junction 503 furnishes a signal 504 denoting the corrected current and constituting a sum of the signals from 501 and 502. The corrected current (504) is utilized for a regulation of the corresponding valve, i.e., a valve which serves to select the torque to be transmitted by a starting clutch (such as 20 or 201 or 202).

The ascertainment of the correction value or values preferably takes place in a quasi stationary condition, namely a condition in which the timely gradient of the desired clutch pressure is below a preselectable lower threshold value, e.g., one bar per second. Once such a condition has been reached (namely when the change of the desired clutch pressure as a function of time is less than the lower threshold value), it is proposed to await the expiration of a given interval of time (e.g., between 500 and 1000 milliseconds, preferably about 200 milliseconds) prior to carrying out of an averaging of the desired actual pressures. For example, the averaging step can involve the utilization of a time window of ten milliseconds or a low multiple of ten milliseconds. In the event of a monitoring in the ten-millisecond range, this can result in a number of measurements or samplings in the range of ten (or close to ten) samplings. The next step involves a determination of the difference between the averaged desired pressure and the actual pressure.

Once such difference has been ascertained, the control unit compares the difference between the averaged desired pressure and the actual pressure with threshold values. If the departure from a first lower threshold value is less than 0.01 to 0.05 bar (particularly 0.02 bar), the characteristic curve need not be corrected. If the extent of departure is between a lower threshold value of between 0.01 and 0.05 bar and an upper threshold value (e.g., between 0.1 and 0.5 bar, especially 0.25 bar), one can resort to a fixed current correction value of, for example, 1–5 mA. If the difference exceeds the upper threshold value, the extent of the additive correction is ascertained or calculated in dependency upon the differences between the averaged values, and the difference can be amplified with a weighing factor. For example, one can resort to a correction in accordance with the equation $$E_{korr} = (P_{kSoll} - P_{kIst}) \times \text{factor}$$

wherein $E_{korr}$ is the correction value for current adaption, $P_{kSoll}$ is the desired pressure, and $P_{kIst}$ is the actual pressure.

Figure 11:
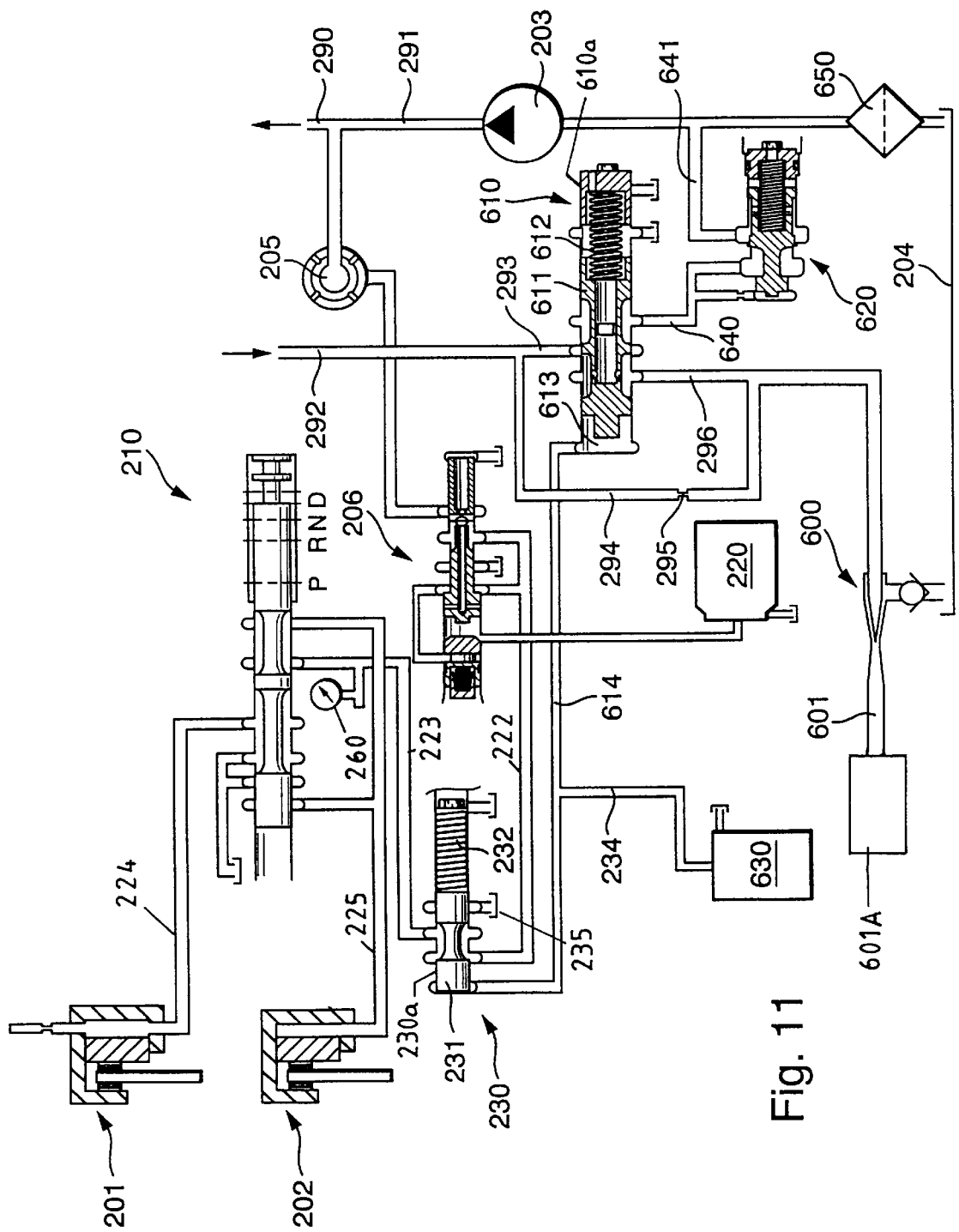
FIG. 11 is a view similar to that of FIG. 7 but showing a different hydraulic operating system for two clutches of a transmission for use in the power train of a motor vehicle.

FIG. 11 shows a hydraulic regulating arrangement constituting a modification of the arrangement which is shown in FIG. 7. Those constituents of the arrangement shown in FIG. 11 which are identical with or clearly analogous to the corresponding constituents of the arrangement of FIG. 7 are denoted by the same reference characters.

The pump 203 which is shown in FIG. 11 draws a fluid (such as oil) from a sump 204 by way of a filter 650, and the outlet of this pump supplies fluid at system pressure to a conduit 291. Such pressurized fluid is utilized for a regulation of the operation of one or more starting disc clutches (201, 202) and/or for a regulation (selection) of the transmission ratio and/or for the initiation and the carrying out of the movements of axially adjustable flanges (such as 301a, 302a in FIG. 8) of pulleys (such as 301, 302) forming part of a continuously variable transmission (CVT). The conduit (outlet) 290 branches off the conduit 291 and serves to supply pressurized fluid to the actuators of a continuously variable transmission (see the actuators 304, 305 and 306, 307 in the transmission of FIG. 8), i.e., such fluid can be used to urge the flanges of the pulleys against the adjacent portions of an endless chain or belt in a continuously variable transmission with a desired force to prevent any slip or to regulate the extent of slip.

A further conduit 292 serves to supply fluid from the actuators and/or a cooler (heat exchanger) 601a and/or the clutch or clutches back to the sump 204. The illustrated conduit 292 has two branches 293 and 294. The branch 294 serves as a bypass and contains a flow restrictor 295 (e.g., a standard throttle) which supplies fluid to a suction type jet pump 600. The flow of fluid which is supplied to the pump 600 by the conduit 294 enables this pump to draw additional fluid from the sump 204 and to supply the thus increased quantity of fluid to the cooling system 601a by way of a conduit 601. The cooled fluid can be used to cool the starting clutch(es) of the transmission and/or the clutch between the engine and the input shaft of the transmission. The exact manner in which the fluid which is being supplied by the conduit 601 and is being cooled in one or more heat exchangers of the cooling system 601a is utilized to cool one or more clutches or the like forms no part of the present invention. The coolant is or can be used primarily to cool the clutch(es) in the region of the friction surfaces.

The flow restrictor 295 in the bypass conduit 294 serves to enhance a predetermined (predictable) rate of fluid flow to the intake of the jet pump 600 and to thus ensure a highly predictable cooling of friction surfaces in the clutch(es) receiving cooled fluid from the cooling system 601a downstream of the conduit 601; this holds true if the jet pump 600 is utilized in the hydraulic circuit of a continuously variable transmission or any other type of transmission in the power train of a motor vehicle.

The valve 610 of FIG. 11 serves to regulate the return flow of fluid through the conduit 292; the valving element or spool 611 in the housing or body 610a of the valve 610 can assume a position in which the conduit 293 supplies fluid to the pump 203 by way of a valve 620, as well as a position in which the conduit 293 delivers fluid to a conduit 296, i.e., to the jet pump 600.

The valve 620 serves to regulate the quantities of fluid flowing from the valve 610 back to the pump 203; this valve 620 is a pressure limiting valve, and more specifically a valve which prevents the pressure of fluid in a conduit 640 from dropping below a selected minimum acceptable pressure, e.g., in the range of a few bar not necessarily exceeding five bar. The valve 620 establishes a path for the flow of fluid from the conduit 640 to a conduit 641 and thence to the intake of the pump 203 when the pressure in the conduit 640 matches or exceeds the selected minimum acceptable pressure. Such adjustment or mode of operation of the valve 620 ensures that, when the valve 620 is set to establish communication from the conduit 293 to the conduit 640, fluid will flow from the conduit 640 and to the intake of the pump 203 (i.e., through the conduit 641) only when the pressure in the conduits 293, 294 is above a predetermined minimum pressure.

The spool 611 in the housing 610a of the valve 610 is shiftable axially under or against the bias of a suitable valve spring 612, e.g., a coil spring. When the spring 612 is free to dissipate energy, the spool 611 moves in a direction to the left (as viewed in FIG. 11) and reduces the volume of the chamber 613 in the housing 610a of the valve 610. The pressure of fluid in the chamber 613 is regulated by a pilot or control valve 630 which regulates such pressure by way of the conduits 234 and 614. The valve 630 receives signals from an electronic control unit (not shown) corresponding to the control unit 340A for the valve 340 (shown in FIG. 8) or the control unit 50A for the valve 50 (shown in FIG. 4). The control valve 630 further serves to regulate the fluid pressure in a chamber to the left of the spool 231 in the housing or body 230a of the safety valve 230; this spool 231 is biased by a valve spring 232 and controls the flow of fluid between the conduits 222, 223 (and on to the conduits 224, 225) in a manner as already described with reference to FIG. 7. Thus, the valve 630 of FIG. 11 controls the valve 610 (i.e., the fluid pressure in the chamber 613) as well as the safety valve 230 (by controlling the fluid pressure in the chamber of the housing 230a to the left of the spool 231).

If the pressure of fluid in the conduit 234 of FIG. 11 is zero or close to zero, the control valve 630 does not influence the clutches 201, 202 because the axial position of the spool 231 is determined solely by the valve spring 232; this enables the valve 206 to regulate the pressure of fluid in the conduit 223 (and hence the pressures of fluid in the chambers of the clutches 201, 202) by way of the safety valve 230. The valve 206 is controlled by a control or pilot valve 220. If the pressure of fluid in the conduit 234 is low, the pressure of fluid in the conduit 614 is also low so that the spool 611 of the valve 610 can be shifted by the valve spring 612 to expel fluid from the chamber 613. This ensures that all or nearly all of the fluid flowing in the conduit 292 into the conduit 293 can flow back to the intake of the pump 203 (via conduit 640, valve 620 and conduit 641). At the same time, a certain percentage of the fluid medium flowing from the conduit 292 toward the conduit 293 can enter the bypass conduit 294 to pass through the flow restrictor 295 and to flow to the intake of the jet pump 600.

If the control valve 630 receives one or more signals indicating that the fluid pressure in the conduits 293 and 614 should be increased to a median value, the condition of the safety valve 230 remains unchanged (because the increased pressure of fluid in the chamber of the valve 230 does not suffice to shift the spool 231 against the opposition of the spring 232). However, the just mentioned rise of fluid pressure in the conduit 614 to a median value suffices to cause the fluid in the chamber 613 of the valve 610 to move the spool 611 against the bias of the spring 612; the spool 611 then assumes a position in which the fluid being supplied by the conduit 293 cannot enter the conduit 640 (i.e., it cannot flow back to the pump 203 via valve 620 and conduit 641) but flows to the intake of the jet pump 600 by way of the conduit 296.

If the control valve 630 causes the fluid pressure in the conduits 234 and 614 to rise to a maximum value, the condition of the valve 610 remains unchanged (the fluid continues to flow from the conduit 293 into the conduit 296 and on to the jet pump 600); however, the fluid flowing from the conduit 234 into the chamber which is located to the left of the spool 231 in the housing 230a of the safety valve 231 induces the spring 232 to store energy (or additional energy) so that the clutches 201, 202 are disengaged because the conduit 223 is free to discharge into the sump 235.

It will be seen that the hydraulic circuit of FIG. 11 renders it possible to employ a single pilot or control valve (630) to adjust the safety valve 230 as well as the valve 610 by the simple expedient of varying the fluid pressure in the conduits 234 and 614 between different values (such as the aforementioned low, median and maximum pressures). The valve 610 reacts to the minimal and maximal pressures of the fluid in the conduits 234, 614 to direct the returning fluid to the intake of the pump 203 or to the intake of the jet pump 600 (i.e., to the cooling system 601a). On the other hand, the safety valve 230 reacts to an increase of fluid pressure in the conduit 234 to a maximum value to thus disengage the clutches 201, 202 as well as to ensure an intensive cooling of such clutches because the jet pump 600 delivers fluid into the conduit 601 (i.e., to the cooling system or systems 601a) at a maximum rate.

The pilot or control valve 630 renders it possible to shift (by way of the valve 610) to a cooling of the clutch or clutches by way of the fluid which is supplied by the jet pump 600, as well as to actuate the safety or relief valve 230 when it becomes necessary to disengage the clutches 201 and 202.

The valve 620 acts as a pressure regulating means to ensure that the pressure of fluid in the conduit 640 must match or exceed a preselected threshold value before the valve 620 prevents the fluid from flowing through the conduit 640 and on to the intake of the pump 203 by way of the conduit 641. Thus, the valve 620 seals the conduit 640 from the conduit 641 until the pressure of fluid in the conduit 640 matches or exceeds the preselected value. As already explained hereinbefore, this ensures that the pressure of fluid in the conduit 294 cannot drop to any value when the valve 610 prevents the flow of fluid from the conduit 293 into the conduit 640, i.e., to the intake of the pump 203.

The hydraulic system of FIG. 11 can be utilized with advantage in combination with a continuously variable transmission (e.g., a transmission of the type shown in FIG. 4, 7 or 8) with at least one starting clutch, e.g., with two clutches 201, 202 each of which includes a cylinder and piston unit (201a, 201b and 202a, 202b), with actuators (such as 304, 305 and 306, 307) shown in FIG. 8) which change the ratio of the continuously variable transmission, with at least one pump (such as 203) for supplying a suitable fluid at system pressure, and with valves (such as 610, 206, 230 and 210 shown in FIG. 11) for supplying pressurized fluid to the consumers and for permitting the fluid to flow back to the sump. Such valves can serve to supply a fluid as well as to ensure that the fluid is maintained at a requisite pressure. Thus, the valve 630 can control the operation of the valve 610 (by changing the position of the spool 611) so that the fluid can flow from the actuators for the transmission to the conduit 292, or the valves can cooperate in a manner as described with reference to FIG. 8, or the valves can cooperate in a manner to supply fluid to several pumps (such as 203 and 600) for the purposes of supplying fluid at system pressure as well as of cooling the fluid preparatory to circulation through the clutch(es) and/or other parts which should be cooled at all times or only under certain circumstances (e.g., when the friction clutch(es) operates or operate with slip. The illustrated pump 600 is a suction type jet pump.

The features of various embodiments of the invention actually shown in the drawings and/or of any and all other embodiments which are disclosed in this specification can be combined with and/or substituted for and/or modified in view of each other in a number of ways without departing from the spirit of the present invention. Furthermore, through the various improvements embodying the present invention are shown as being incorporated into or assembled with a transmission for use in the power train of a motor vehicle, such improvements (e.g., that described with reference to FIGS. 1 to 3) can be utilized with equal or similar advantage under numerous circumstances in fields other than the field of automobiles or other types of vehicles. Thus, and referring again to FIGS. 1 to 3, the fields of possible and advantageous utilization of the combination of a conduit with two components which may (but need not always) turn relative to each other are too numerous to mention and/or to be illustrated herein; all such fields will readily occur to those skilled in the relevant art or arts upon perusal of the preceding description in conjunction with the accompanying drawings.

Continuously variable transmissions which can be improved in a number of ways upon incorporation of one or more features of the present invention are disclosed, for example, in commonly owned U.S. Pat. Nos. 5,046,991 (granted Sep. 10, 1991 to Friedmann for "CONTINUOUSLY VARIABLE SPEED TRANSMISSION"), U.S. Pat. No. 5,169,365 (granted Dec. 8, 1992 to Friedmann for "POWER TRAIN"), U.S. Pat. No. 5,217,412 (granted Jun. 8, 1993 to Indlekofer et al. for "CONTINUOUSLY VARIABLE SPEED TRANSMISSION"), U.S. Pat. No. 5,295,915 (granted Mar. 22, 1994 to Friedmann for "CONTINUOUSLY VARIABLE SPEED TRANSMISSION"), U.S. Pat. No. 5,667,448 (granted Sep. 16, 1997 to Friedmann for "POWER TRAIN"), and U.S. Pat. No. 5,711,730 (granted Jan. 27, 1998 to Friedmann et al. for "TORQUE MONITORING APPARATUS"). The disclosues of all of the above-enumerated U.S. patents, as well as the disclosure of the aforementioned German application, are incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of transmissions and fluid-operated regulating systems therefor and, therefore, such adaptations should and are intended to be comprehended within the meaning and range of equivalence of the appended claims.

What is claimed is:

1. In a variable-speed transmission, particularly for use in a power train of a motor vehicle, the combination of:

at least one fluid-operated clutch including a cylinder and a piston movable in a chamber of said cylinder;

means for cooling said at least one clutch;

at least one fluid-operated actuator;

at least one source of pressurized fluid;

conduit means connecting said at least one source with said at least one clutch and said at least one actuator;

an adjustable slide valve installed in said conduit means and including a housing and a valving element movable in said housing between a plurality of positions; and means for adjusting said slide valve including a pilot valve arranged to move said valving element (a) to a first position in which said slide valve permits fluid to flow from said cylinder and from said at least one actuator to said at least one source, and (b) a second position in which said slide valve establishes a path for the flow of fluid to a pump arranged to supply fluid to said cooling means.

2. The structure of claim 1, wherein said at least one source includes a second pump.

3. The structure of claim 1, wherein said pump is a suction type jet pump.

4. The structure of claim 1, wherein said conduit mneaus comprises a bypass conduit arranged to convey fluid to said pump in the second position of said valving element, and further comprising at least one flow restrictor in said bypass conduit.

5. The structure of claim 1, further comprising an adjustable safety valve provided in said conduit means between said slide valve on the one hand, and said cylinder and said at least one actuator on the other hand.

6. The structure of claim 5, wherein said safety valve is adjustable by said pilot valve.

7. The structure of claim 6, wherein said pilot valve is arranged to furnish to said slide valve and to said safety valve fluid at, a plurality of different pressures including a maximum pressure to thereby change the condition of said safety valve, a minimum pressure at which the condition of said slide valve remains unchanged, and a medium pressure to thus change the condition of said slide valve.

\* \* \* \* \*